(12) United States Patent
Mokhtari et al.

(10) Patent No.: US 10,098,207 B2
(45) Date of Patent: Oct. 9, 2018

(54) DEVICE AND METHOD FOR CONTROLLING A LIGHTING MEANS

(71) Applicants: Ramin Lavae Mokhtari, Potsdam (DE); Gerd Ascheid, Aachen (DE)

(72) Inventors: Ramin Lavae Mokhtari, Potsdam (DE); Gerd Ascheid, Aachen (DE)

(73) Assignee: ICE Gateway GmbH, Berlin (DE)

( * ) Notice: Subject to any disclaimer, the term of this patent is extended or adjusted under 35 U.S.C. 154(b) by 0 days.

(21) Appl. No.: 14/962,099

(22) Filed: Dec. 8, 2015

(65) Prior Publication Data

US 2016/0095193 A1    Mar. 31, 2016

Related U.S. Application Data

(63) Continuation of application No. PCT/EP2014/062393, filed on Jun. 13, 2014.

(30) Foreign Application Priority Data

Jun. 13, 2013 (DE) .................. 20 2013 005 527 U
Jun. 13, 2013 (DE) .................. 20 2013 005 528 U
Feb. 28, 2014 (DE) .................. 10 2014 102 678

(51) Int. Cl.
  *H05B 37/02*  (2006.01)
  *H05B 33/08*  (2006.01)

(52) U.S. Cl.
  CPC ..... *H05B 37/0272* (2013.01); *H05B 33/0842* (2013.01); *H05B 33/0896* (2013.01)

(58) Field of Classification Search
  CPC ................ Y02B 20/72; H05B 37/0272; H05B 33/0842; H05B 33/0896
  See application file for complete search history.

(56) References Cited

U.S. PATENT DOCUMENTS 7,546,168 B2 * 6/2009 Walters ................. G06Q 30/04
                                                              340/3.1
2004/0137878 A1 * 7/2004 Oyama ............. H04N 5/44582
                                                              455/411

(Continued)

FOREIGN PATENT DOCUMENTS

CN   101287324 A   10/2008
CN   101965082 A    2/2011

(Continued)

OTHER PUBLICATIONS

SIMCom, Hardware Design, webpage, Dec. 26, 2009, 58 pages, Shanghai SIMCom Wireless Solutions Ltd. http://pdf.datasheet.netdna-cdn.com/770979/SIM900A.pdf.

(Continued)

*Primary Examiner* — Douglas W Owens
*Assistant Examiner* — Pedro C Fernandez
(74) *Attorney, Agent, or Firm* — Reinhart Boerner Van Deuren P.C.

(57) ABSTRACT

A device for controlling a lighting means is provided, which comprises at least one communication means, configured to receive first data and transmit second data via at least one wireless communication network and to at least partially forward the first data. The at least partially forwarded first data comprise third data. The device also comprises at least one security means, configured to at least partially decrypt the third data and to at least partially encrypt fourth data. The second data are at least partially based on the at least partially encrypted fourth data. The device also comprises at least one signal processing means, configured to control a lighting means connected to the device at least partially depending on the at least partially encrypted third data, to at least partially generate and/or to receive the fourth data, and to forward the received and/or generated fourth data.

21 Claims, 5 Drawing Sheets

(56) References Cited

U.S. PATENT DOCUMENTS

| | | | |
|---|---|---|---|
| 2006/0291212 A1* | 12/2006 | Forsman | G10H 1/0016 362/276 |
| 2007/0091623 A1 | 4/2007 | Walters et al. | |
| 2008/0018494 A1* | 1/2008 | Waite | H05B 33/0803 340/907 |
| 2009/0196016 A1* | 8/2009 | Massara | F21V 23/0471 362/86 |
| 2010/0029268 A1 | 2/2010 | Myer et al. | |
| 2012/0080944 A1* | 4/2012 | Recker | H02J 9/02 307/25 |

FOREIGN PATENT DOCUMENTS

| | | |
|---|---|---|
| CN | 202085372 U | 12/2011 |
| DE | 10 2006 058 147 A1 | 6/2008 |
| EP | 1 251 721 A1 | 10/2002 |
| EP | 2 262 350 A1 | 12/2010 |
| EP | 2 439 495 A1 | 4/2012 |
| WO | WO 03/098977 A1 | 11/2003 |
| WO | WO 2011/053132 A2 | 5/2011 |

OTHER PUBLICATIONS

Murata, Innovator in Electronics, DNT2400, Low Cost 2.4 GHz FHSS Transceiver Module with I/O, 2010, 7 pages, Murata Manufacturing Co., Ltd.

* cited by examiner

DEVICE AND METHOD FOR CONTROLLING A LIGHTING MEANS

CROSS REFERENCE TO RELATED APPLICATIONS

This patent application is a continuation of PCT/EP2014/062393, filed Jun. 13, 2014, which claims priority to German Application No. 20 2013 005 528.6, filed Jun. 13, 2013, German Application No. 20 2013 005 527.8, filed Jun. 13, 2013, and German Application No. 10 2014 102 678.0, Feb. 28, 2014, the entire teachings and disclosure of which are incorporated herein by reference thereto.

FIELD OF THE INVENTION

The invention relates inter alia to a device and a method for controlling a lighting means.

BACKGROUND OF THE INVENTION

In the prior art devices are known for controlling a lighting means, which can be controlled from a central control device and which comprise a processor for controlling the lighting means. Such devices are used in particular in outdoor applications for controlling lighting means in street lamps. However, the known devices are only suitable for controlling one lighting means, so that the entire device must be exchanged, if the street lamp is converted to another lighting means. Furthermore, the known devices are not sufficiently protected against manipulation such as by malware and in the event of such manipulation must be repaired at great expense on-site (e.g. by replacing memories and/or processors).

BRIEF SUMMARY OF THE INVENTION

An object of the invention is therefore to overcome the abovementioned disadvantages.

This object is achieved by the subject matter of the independent claims. Advantageous exemplary embodiments of the invention can be found in the subclaims.

A device according to the invention for controlling a lighting means comprises one or more communication means, which are configured to receive first data via at least one wireless communication network and to transmit second data via the at least one wireless communication network, wherein the communication means are furthermore configured to at least partially forward the first data, wherein the at least partially forwarded first data comprise third data, one or a plurality of security means, which are configured to at least partially decrypt the third data and to at least partially encrypt fourth data, wherein the second data are at least partially based on the at least partially encrypted fourth data, and one or a plurality of signal processing means, which are configured to control a lighting means connected with the device (e.g. a DC-operated lighting means) at least partially depending on the at least partially decrypted third data, wherein the signal processing means are furthermore configured to at least partially generate and/or to receive the fourth data and to forward the received and/or generated fourth data.

A method according to the invention comprises the receiving of first data via at least one wireless communication network by one or more communication means, transmitting second data via the at least one wireless communication network by the communication means, at least partially forwarding the first data, wherein the at least partially forwarded first data comprise third data, at least partially decrypting the third data by one or a plurality of security means, controlling a lighting means at least partially depending on the at least partially decrypted third data by the signal processing means, generating and/or receiving fourth data by the signal processing means, forwarding the generated and/or received fourth data by the signal processing means, and at least partially encrypting the fourth data by the security means, wherein the second data are at least partially based on the at least partially encrypted fourth data.

For example, the communication means of the device according to the invention correspond to the communication means of the method according to the invention. For example, the signal processing means of the device according to the invention correspond to the signal processing means of the method according to the invention. For example, the security means of the device according to the invention correspond to the security means of the method according to the invention. By way of example, the method according to the invention is carried out by a device according to the invention.

For example, the communication means, the signal processing means and the security means are at least partially different. For example, the communication means, the signal processing means and the security means are at least partially different means of the device according to the invention. For example, the communication means, the signal processing means and the security means are at least partially in the form of hardware modules and/or software modules of the device according to the invention. A hardware module is for example configured to perform one or more logic functions. The logic functions can be hardwired or fixed programmed in a one-time programmable hardware module (unchangeable). The logic functions can be programmed in a programmable hardware module (changeable) (e.g. by firmware and/or software).

A hardware module is for example an electronic circuit, a processor and/or a programmable logic device (PLD). An example of a processor is a general purpose processor, a microprocessor, a microcontroller unit such as a microcontroller, a digital signal processor (DSP), an Application Specific Integrated Circuit (ASIC), a Field Programmable Gate Array (FPGA) and an Application Specific Instruction-Set Processor (ASIP). For example, the communication means can be a communications processor and/or a communication circuit. For example, the security means can be a security processor and/or a safety circuit. For example, the signal processing means can be a signal processing processor and/or a signal processing circuit.

For example, the device according to the invention is connected by the communication means with the at least one wireless communication network. For example, the device according to the invention is connected by the communication means with the at least one wireless communication network, so that the first data can be received via the at least one wireless communication network at the device according to the invention and that the second data can be transmitted by the device according to the invention via the at least one wireless communication network.

The first data are for example data transmitted from an entity (e.g. a central control device and/or a further device for controlling a lighting means) connected with the at least one wireless communication network via the at least one wireless communication network to the device according to the invention. The second data are for example data transmitted by the device according to the invention via the at least one wireless communication network to an entity connected with the at least one wireless communication network.

For example, the communication means are configured to establish a connection between the device according to the invention and one or a plurality of further entities (e.g. a central control device and/or a further device for controlling a lighting means) connected with the at least one wireless communication network, at least partially via the wireless communication network. For example, such a connection is connection-oriented or connectionless. By way of example such a connection is packet switched or circuit switched. For example, such a connection is a secure connection. A secure connection is for example an encrypted connection such as a Secure Socket Layer (SSL) connection, and/or a Virtual Private Network (VPN) connection. For example, the first and/or the second data can be transmitted via such a connection.

For example, the communication means comprise a network interface for the at least one wireless communication network. A network interface comprises for example a network card, an antenna, a network module and/or a modem. A network interface can for example be a module, which is directly soldered to the PCBs and which can also be assigned various over-the-air telecommunications services. For example, the communication means comprise a transmitter and/or receiver such as a WLAN transmitter and/or receiver, an RFID transmitter and/or receiver, a Bluetooth transmitter and/or receiver or an iBeacon transmitter.

For example, the communication means comprise a processor, by way of example a processor that is configured to control a network interface. For example, the communication means comprise at least one processor and at least one memory with program instructions (e.g. a program memory and a main memory), wherein the at least one memory and the program instructions are configured together with the at least one processor, to cause the communication means to control the transmission and reception of data via the at least one wireless communication network. For example, in the memory an operating system (e.g. an embedded operating system such as embedded Linux or Windows CE) is stored. This is, by way of example, advantageous, in order to allow high flexibility and expandability of the communication means. For example, such operating systems are supported by various manufacturers of network interfaces (e.g. network modules), so that the network interface (e.g. the network modules) can be integrated into the operating system via device driver programs available from the manufacturers. For example, and furthermore, a communication program with program instructions for controlling the transmission and reception of data via the at least one wireless communication network is stored in a memory of the processor.

A wireless communication network is by way of example a radio network and/or an optical network. An example of a radio network is a mobile radio network such as a Global System for Mobile Communications (GSM) network, a GPRS (General Packet Radio Service) network, a Universal Mobile Telecommunications System (UMTS) network, or a Long Term Evolution (LTE) network. A further example of a wireless communication network is a wireless IEEE 802 network such as a Wireless Local Area Network (WLAN), an IEEE 802.11 network, a Worldwide Interoperability for Microwave Access (WiMAX, an IEEE 802.16 network) network, a Bluetooth network (an 802.15.1 network) and a Zigbee network (an IEEE 802.15.4 network). For example, the at least one wireless communication network is a wireless local communication network or a wireless non-local communication network. An example of an optical network is an Infrared Data Association (IrDA) network. For example, the wireless communication network is at least partially a network with a mesh topology. Other network topologies are conceivable, however.

Data can for example be understood to be information which can be processed by one or more processors. By way of example, data can comprise digital information and/or analogue information. Data can for example be transmitted by current signals, voltage signals, optical signals and/or radio signals (e.g. sent and/or received). By means of a packet-switched connection data are transmitted for example in the form of data packets.

At least partially forwarding first data by the communication means, means for example that the communication means send to the signal processing means and/or the security means or provide for sending to the signal processing means and/or the security means at least a part of the first data (e.g. third data contained therein). For example, only the third data contained in the first data are forwarded.

Forwarding of the fourth data generated and/or received by the signal processing means, means for example, that the signal processing means send the fourth data to the communication means and/or the security means or provide them for sending to the communication means and/or the security means.

For example, the communication means and the signal processing means are connected to one another (e.g. directly and/or indirectly). For example, the communication means forward the first data at least partially via the connection between the communication means and the signal processing means. For example, the signal processing means forward the fourth data at least partially via the connection between the communication means and the signal processing means.

For example, security means are disposed in the connection between the communication means and the signal processing means. For example, security means are disposed in the connection between the communication means and the signal processing means, so that the first data at least partially forwarded by the communication means, and containing the third data, are transmitted via the security means. For example, security means are disposed in the connection between the communication means and the signal processing means so that the fourth data forwarded by the signal processing means are transmitted via the security means. For example, security means are disposed in the connection between the communication means and the signal processing means, so that a data transmission between the communication means and the signal processing means can take place only via the security means. By way of example, the communication means are connected with the security means and the signal processing means are connected with the security means.

For example, the connections between the communication means, the signal processing means and the security means are wired connections. A wired connection is for example a lead-based or cable-based connection such as a microstrip line connection, a bond wire connection and/or a coaxial cable connection. A wire-based connection can for example allow a serial data transmission and/or a parallel data transmission.

For example, the third data are at least partially encrypted with a symmetrical, hybrid or asymmetrical encryption method. For example, the third data can be decrypted with an individual key. For example, the individual key is assigned to just one device according to the invention (or a group of devices according to the invention) and is used only for decryption of third data for this device (or this group of devices). For example, further devices according to the invention (or further groups of devices according to the invention) are similarly assigned respective individual keys. For example, the security means are configured to decrypt the third data.

For example, the fourth data forwarded by the signal processing means to the communication means are unencrypted. For example, the security means are configured to encrypt the fourth data at least partially. For example, the fourth data are encrypted by the security means with an individual key. For example, the individual key is assigned to only one device according to the invention (or a group of devices according to the invention) and is used only by this device (or this group of devices) for encrypting the fourth data. For example, further devices according to the invention (or further groups of devices) are similarly assigned respective individual keys.

An example of a symmetrical encryption method is the AES encryption method. A symmetrical encryption method is advantageous, inter alia, if a large amount of data has to be encrypted, as it is less complex than an asymmetrical encryption method. An example of an asymmetrical encryption method is the RSA encryption method and/or the elliptical curve cryptography encryption method. An asymmetrical encryption method is advantageous, inter alia, if small amounts of data have to be encrypted, as it is harder to attack (thus to crack) than a symmetrical encryption method.

For example, the security means are configured to at least partially decrypt the third data contained in the first data forwarded by the communication means and to at least partially encrypt the fourth data forwarded by the signal processing means. For example, the security means are configured to decrypt all first data forwarded by the communication means (e.g. all third data) and to encrypt all fourth data forwarded by the signal processing means. This is advantageous, for example, in order to protect the data (e.g. the first and second data or the third and fourth data) transmitted via the at least one wireless communication network and to allow a secure communication. Between the security means and the communication means and via the at least one wireless communication network the data can thus by way of example be transmitted in encrypted form. The security means can thus be the endpoint of an end-to-end encryption, and the other endpoint of the end-to-end encryption can for example be a central control device. In this way protection of the data transmitted between the signal processing means and the central control device can be guaranteed, irrespective of the integrity of the connection (and any intermediate stations such as the communication means) between the signal processing means and the central control device.

For example, the security means comprise a programmable logic device, a hardware security module and/or a processor such as an encryption processor.

For example, a key for decrypting third data and/or a key for encrypting the fourth data can be programmed into, stored and/or hardwired in the security means; preferably the keys are programmed into, stored and/or hardwired in the security means, so that they cannot be read off. For example, the key for decrypting the third data and/or the key for encrypting the fourth data is fixed programmed, permanently stored and/or hardwired in the security means. For example, the keys can be hardwired by activated fuses and/or antifuses in a one-time programmable logic device. For example, the keys can be fixed programmed and/or permanently stored in an (internal) Read Only memory (ROM) of a processor. For example, the keys are programmed into, stored and/or hardwired in, the security means so that they cannot be read off by the communication means. For example, the encryption function and/or the decryption function of the security means is/are fixed programmed in and/or hardwired in the security means. This is advantageous, for example, in order to prevent the possibility of the key being read off by malware (e.g. malware, run by a processor of the communication means) and the functions of the security means being manipulated.

Controlling a lighting means (e.g. a lighting means connected to the device according to the invention) by the signal processing means, means for example that the signal processing means is able to control (thus cause) the switching on, switching off and/or dimming of the lighting means.

For example, the device according to the invention comprises one or more energy supply means. For example, the energy supply means are configured to supply the lighting means with energy and/or provide power for operation of the lighting means. For example, the signal processing means are configured to control the energy supply means. For example, the energy supply means comprise a rectifier, a controllable driver circuit and/or a controllable voltage transformer (e.g. a controllable direct current converter). For example, the signal processing means are connected to the energy supply means (e.g. by a wired connection). For example, the energy supply means are connected to the lighting means. For example, the signal processing means are connected via the energy supply means with the at least one lighting means. This is by way of example advantageous, as optimum use can be made of the lighting means, in that they can be used without their own energy supply means and/or control means (e.g. without their own electronics). The necessary optimum control of the lighting means and/or the energy supply means is for example undertaken by the signal processing means. Direct current-based lighting means can for example be connected to a direct current output of the energy supply means, and alternating current-based lighting means can for example be connected with an alternating current output (e.g. an output of a DALI) of the energy supply means.

Controlling a lighting means (e.g. a lighting means connected with the device according to the invention) by the signal processing means, also means for example, that the signal processing means control the energy supply means, to be able to cause the switching on, switching off and/or dimming of the lighting means. For example, the signal processing means are configured to control the lighting means via and/or by the energy supply means.

For example, the signal processing means are configured to control the lighting means depending on the current and voltage parameters of the lighting means, the characteristic curve of the lighting means and/or the ageing of the lighting means (e.g. by controlling the energy supply means, for provision of a corresponding current and/or a corresponding voltage for operation of the lighting means).

For example, a control and/or signal processing program for controlling the lighting means (e.g. a lighting means connected with the device according to the invention) is programmed into, stored and/or hardwired in the signal processing means. For example, the signal processing means comprise a processor. For example, the control and/or signal processing program can be stored in and/or programmed into a memory of the processor. For example, the signal processing means comprise at least one processor and at least one memory with program instructions (e.g. a program memory and a main memory), wherein the at least one memory and the program instructions are configured together with the at least one processor, to cause the signal processing means to control the lighting means. For example, the control and/or signal processing program with program instructions for controlling a lighting means is stored in a memory of the processor.

For example, the third data contain control instructions of a central control device for the signal processing means for controlling a lighting means. Control instructions are for example instructions for switching on, switching off and dimming a lighting means. This is for example advantageous, in order to allow remote control of the lighting means by a central control device.

For example, the third data contain control parameters of a central control device for the signal processing means for controlling a lighting means. Control parameters are for example a switching on time, a switching off time, a dimming value, a light level threshold for switching on/switching off, a supply voltage value and a supply current value. For example, the signal processing means (and for example the energy supply means through the signal processing means) can thus be adapted to any lighting means, by downloading suitable control parameters (e.g. suitable intelligence) via the at least one wireless communication network. This is for example advantageous, to allow flexible adaptation and expansion of the control of the lighting means to a plurality of different lighting means by a central control device.

For example, the control and/or signal processing program comprises a control table with one or more control parameters (e.g. one or more switching on times, one or more switching off times and/or one or more dimming values). For example, the control parameters contained in the third data are stored in the control table. For example, the signal processing means are configured to control the lighting means at least partially depending on the control table (e.g. if no control parameters and/or control instructions are received).

For example, the control instructions and/or control parameters are contained in the third data in encrypted form and are decrypted by the security means. This is for example advantageous, to protect the transmission of the control instructions and/or control parameters via the at least one wireless communication network and for example to prevent unauthorised third parties being able to send control parameters and/or control instructions for the signal processing means for controlling a lighting means via the at least one wireless communication network to the device.

Generation of fourth data by the signal processing means, means by way of example that the signal processing means receive the fourth data at least partially by the processing of data. For example, the fourth data are the result of the processing of data (e.g. the third data) by the signal processing means. For example, the fourth data are the result of the processing of the third data by the signal processing means. For example, the fourth data are the result of the control of the at least one lighting means connected with the device according to the invention by the signal processing means. For example, the signal processing means are configured to log all control events (e.g. switching on, switching off, energy consumption) and/or all faults (e.g. power outage, fault in the lighting means, short circuit) as control information. For example, the fourth data contain control information of the signal processing means for a central control device. For example, the control information is contained in the fourth data in unencrypted form and is encrypted by the security means. This is by way of example advantageous, to protect the transmission of the fourth data via the at least one wireless communication network and for example to prevent unauthorised third parties being able to intercept the fourth data.

Receiving fourth data by the signal processing means, means for example that the signal processing means receive the fourth data at least partially from an external component such as the at least one lighting means, a sensor, a device and/or the energy supply means. For example, the signal processing means can receive the fourth data at least partially via a data interface. An example of a data interface is a USB interface, an IEEE 1394 interface, a CAN bus interface, a Zigbee interface, a Bluetooth interface, a serial interface such as an R232 interface and/or a parallel interface such as an IEEE 1284 interface.

It is for example conceivable, for the signal processing means to only forward part of the data received and/or generated. Only this part of the data received and/or generated is then for example the fourth data.

The device according to the invention is by way of example connectable with at least one lighting means (e.g. a direct current-operated lighting means). For example, the device according to the invention comprises connection means for connection with at least one lighting means. An example of a connection means is a clamp connector, a plug connector, a socket and a lighting means holder.

The lighting means is preferably a direct current-based lighting means. For example, the lighting means is a Light Emitting Diode (LED) lighting means and/or an Organic Light Emitting Diode (OLED) lighting means. The lighting means can, however, also be an alternating current-based lighting means. For example, the lighting means is an electric bulb and/or a gas discharge lamp.

The lighting means is for example part of a lamp. For example, the device according to the invention is connected to a lamp (and its lighting means). For example, a lamp comprises a lamp base (e.g. a lamp housing) and a lighting means. For example, a lamp comprises a lamp base (e.g. a lamp housing), an operating means (e.g. a power supply unit, a voltage transformer and/or a driver circuit) and a lighting means. For example, the lighting means is connected via the lamp base and/or the operating means with the device according to the invention.

It is, however, also conceivable for the lighting means to not be part of a lamp. For example, the lighting means is directly connected with the device according to the invention.

The lamp is preferably a lamp for outdoor applications and/or the lighting means is a lighting means for outdoor applications. Accordingly, the device according to the invention is preferably a device for controlling a lighting means in an outdoor application. For example, the device according to the invention is a device for controlling a lighting means in a street lamp.

The communication means, the signal processing means and the security means are responsible for performing and/or controlling various process steps of the method according to the invention. For example, the communication means, the signal processing means and the security means in each case comprise at least one different hardware module. Through this distribution of the steps across various hardware modules of the device according to the invention it is possible to enable particularly secure, flexible, efficient and robust communication and data processing.

For example, the device according to the invention is used in street lamps. By way of example the device according to the invention is used to convert or retrofit street lamps (e.g. a street lamp with a conventional lighting means) with an LED lighting means and/or an OLED lighting means. This is for example advantageous, because in this way without major additional expense the control of the LED lamp is also enabled, bringing the above advantages.

A system according to the invention comprises at least one central control device; and at least one device according to the invention. A central control device is for example a central control device of an operator of a lighting system, configured to control one or more devices according to the invention for controlling a lighting means. A central control device can for example be one or more entities, connected at least partially via the at least one wireless communication network with the at least one device according to the invention. The central control device is by way of example at least partially connected via the at least one wireless communication network with a device according to the invention or a plurality of devices according to the invention. A central control device can for example be one or more servers, for example one or more servers in a cloud or one or more servers of cloud services.

The computer program according to the invention comprises program instructions, causing a device to control and/or perform the method according to the invention, if the computer program according to the invention is run by one or more processors of the device. A computer program can by way of example be distributed across a network. A computer program can at least partially be software and/or firmware of a processor. For example, the computer program according to the invention comprises one or more subprograms such as a control and/or signal processing program and/or a communication program. A computer program can for example be a cloud solution.

The computer program according to the invention can be stored in a machine-readable storage medium, containing one or more computer programs according to the invention and for example taking the form of a magnetic, electrical, electromagnetic, optical and/or other type of storage medium. Such a machine-readable storage medium is preferably physical (thus "tangible"), for example it takes the form of a data carrier device. Such a data carrier device is by way of example portable or permanently installed in a device. Examples of such a data carrier device are volatile or non-volatile Random Access Memories (RAM) such as for example NOR Flash memories or those with sequential access such as NAND Flash memories and/or Read Only Memories (ROM) or read/write access memories. Machine-readable means, for example, that the storage medium can be read(out) and/or written to by a computer or a data processing system, by way of example by a processor.

The invention thus provides a flexible and expandable solution for controlling lighting means in particular in outdoor applications. The invention allows, inter alia, secure, flexible, efficient and robust communication and data processing.

In the following, exemplary embodiments of the invention are described, which are aimed at further examples of features of the device according to the invention, of the method according to the invention, of the system according to the invention, and of the computer program according to the invention. In particular, through the description of an additional process step of the method according to the invention means shall also be deemed disclosed of performing the step of the device according to the invention and a corresponding program instruction of the computer program according to the invention, causing a device to perform the process step, if the computer program is run by a processor of the device. The same shall apply to the disclosure of a means for performing a process step or a program instruction, for example the disclosure of a means for performing a process step of the device according to the invention shall also be understood to be a disclosure of the corresponding process step of the method according to the invention and a corresponding program instruction of the computer program according to the invention.

In exemplary embodiments of the invention the third data are at least partially decrypted prior to receipt by the signal processing means, and the fourth data are at least partially encrypted prior to receipt by the communication means. For example, the security means are furthermore configured to at least partially decrypt the third data prior to receipt by the signal processing means and to at least partially encrypt the fourth data prior to receipt by the communication means.

For example, the signal processing means receive the third data via a connection between the communication means and the signal processing means. For example, the communication means receive the fourth data via a connection between the communication means and the signal processing means. As described above, the security means are by way of example disposed in the connection between the communication means and the signal processing means so that data transmission between the communication means and the signal processing means can only take place via the security means.

In exemplary embodiments of the invention the security means are further configured to at least partially verify the integrity of the third data. For example, the security means block the third data, if the third data lack integrity. For example, the security means block the third data prior to receipt by the signal processing means, if the third data lack integrity. For example, the third data are signed. By way of example the security means are configured to verify a signature of the third data. For example, the security means block the third data, if the third data are incorrect or not actually signed. For example, the security means block the third data prior to receipt by the signal processing means, if the third data are incorrect or not actually signed.

In exemplary embodiments of the invention the signal processing means are furthermore configured to receive sensor data from at least one sensor connected with the device according to the invention, wherein the fourth data at least partially comprise the sensor data. It is also conceivable for the device according to the invention to be connected with a plurality of sensors. The at least one sensor connected with the device according to the invention is for example disposed inside the device or outside the device.

A sensor can for example be connected in a wired and/or wireless fashion with the device according to the invention and/or the signal processing means. For example, the signal processing means comprise a data interface and/or an analogue-digital converter. An example of a data interface is, as described above, a USB interface, an IEEE 1394 interface, a CAN bus interface, a Zigbee interface, a Bluetooth interface, a serial interface such as an R232 interface and/or a parallel interface such as an IEEE 1284 interface. For example, the signal processing means receive the sensor data at least partially via the data interface. For example, the signal processing means receive the sensor data at least partially via the analogue-digital converter. For example, the data interface and/or the analogue-digital converter (wired and/or wireless) is/are connected with the sensor.

For example, the energy supply means of the device according to the invention are configured to provide the at least one sensor with energy and/or to provide power for operating the sensor (e.g. via a wire-based connection with the sensor and/or via a wire-based data interface). For example, the signal processing means are configured to control the energy supply means accordingly. This is by way of example advantageous, because the at least one sensor connected with the device according to the invention does not need an independent energy supply means.

The fourth data are for example at least partially sensor data from the at least one sensor connected with the device according to the invention. It is also conceivable, however, for the fourth data not to comprise the sensor data.

The signal processing means are by way of example configured to at least partially process sensor data from the at least one sensor connected with the device according to the invention. Processing of the sensor data by way of example means the organising and/or modification of the sensor data. For example, the signal processing means are configured to apply at least one signal processing algorithm to at least a part of the sensor data. For example, the fourth data comprise at least partially the processed sensor data or the result of the processing of the sensor data (e.g. the result of the at least one signal processing algorithm applied to the sensor data). This is for example advantageous, to allow (pre)processing of the sensor data received from the at least one sensor connected with the device according to the invention and to send only the (pre-)processed data via the at least one wireless communication network to a central control device. Furthermore, this is by way of example advantageous, in order to use a stand-alone or preventive logic.

A sensor shall by way of example mean a device (e.g. a video camera) and/or a component (e.g. a CCD sensor and/or a CMOS sensor), in particular an electrical or electronic component, configured to be able to capture certain physical or chemical characteristics (e.g. radiation, temperature, moisture, pressure, noise, brightness or acceleration) and/or the material composition of its environment qualitatively or quantitatively as a measured value. The values are by way of example captured by means of physical or chemical effects and converted into electrical signals allowing further processing.

A sensor is an example of a device. For example, a sensor is a device, having no independent energy supply (e.g. no independent power supply unit), no radio module and/or no intelligence.

It is also conceivable for the signal processing means to be configured to receive (general) device data from at least one device connected with the device according to the invention, wherein the fourth data at least partially comprise the device data. The device data can by way of example be processed by the signal processing means just like the sensor data.

Exemplary embodiments of the invention thus provide a flexible and expandable solution for controlling lighting means and for operating sensors and devices in particular in outdoor applications. The invention allows, inter alia, secure, flexible, efficient and robust communication with the device according to the invention, with the signal processing means and with at least one sensor connected with the device according to the invention and flexible and efficient data processing. The device according to the invention by way of example provides a gateway or a gateway functionality, which can be used by the sensors and devices connected with the device according to the invention. This is for example advantageous, to be able to design the communication via the at least one wireless communication network to be more efficient.

In exemplary embodiments of the invention the at least one sensor is a temperature sensor (e.g. a thermometer, a thermocouple and/or a thermal resistor), an ambient temperature sensor, a brightness sensor, a movement sensor (e.g. a motion detector), an acoustic sensor, a noise sensor (e.g. a microphone), an ultrasonic sensor, an optical sensor, an infrared sensor, a light sensor (e.g. a photodiode and/or a photoresistor), an image sensor (e.g. an imaging camera, a CMOS sensor and/or a CCD sensor), a video sensor (e.g. a video camera, a CMOS sensor and/or a CCD-Sensor), a current sensor, a voltage sensor, a power sensor, a chemical sensor (e.g. a gas sensor), an explosive material detection sensor, a signal sensor (e.g. a capacitive sensor, an inductive sensor, an electromagnetic sensor such as an antenna and/or a receiver), and/or a shock sensor (e.g. a shock sensor for detection of earthquakes).

In exemplary embodiments of the invention the signal processing means are furthermore configured to control the lighting means connected with the device according to the invention at least partially depending on the sensor data. For example, the control and/or signal processing program contains corresponding program instructions.

For example, the at least one sensor connected with the device according to the invention is an ambient temperature sensor and the sensor data are at least partially ambient temperature data of this sensor. For example, the signal processing means are configured to control the lighting means connected with the device according to the invention at least partially depending on these ambient temperature data. By way of example the power provided by the energy supply means for operating the lighting means can be controlled so that the lighting means is protected from temperatures that are damaging for the lighting means.

For example, the at least one sensor connected with the device according to the invention is an image sensor and the sensor data are at least partially image data from this sensor. For example, the signal processing means are configured to control the lighting means connected with the device according to the invention at least partially depending on these image data. For example, the signal processing means are configured to apply one or more image processing algorithms to the image data and to control the lighting means connected with the device according to the invention depending on the result of the image processing algorithms. By way of example the signal processing means can dim up the lighting means in certain hazard situations (e.g. if it is detected that a child has run onto the road).

For example, the at least one sensor connected with the device according to the invention is an acoustic sensor (e.g. a noise sensor) and the sensor data are at least partially audio data from this Sensor. For example, the signal processing means are configured to control the lightning means connected with the device according to the invention at least partially depending on these audio data. For example, the signal processing means are configured to apply one or more data processing algorithms to the audio data and to control the lighting means connected with the device according to the invention depending on the result of the data processing algorithms. For example, these data processing algorithms can evaluate the audio data with regard to the traffic passing by the device according to the invention (e.g. the traffic density, the traffic direction and/or the speed). By way of example the signal processing means can dim the lighting means up or down in certain traffic situations (e.g. dim them up with high traffic volumes and down with low traffic volumes).

For example, the at least one sensor connected with the device according to the invention is a shock sensor for detection of earthquakes and the sensor data are at least partially shock measurement data from this Sensor. For example, the signal processing means are configured to control the lighting means connected with the device according to the invention at least partially depending on these shock measurement data. For example, the signal processing means are configured to apply one or more data processing algorithms to the shock measurement data. For example, these data processing algorithms can serve for filtering the shock measurement data, for example in order to filter out vibrations caused by passing traffic from the shock measurement data. For example, as a result shock waves from all directions can be detected. For example, the lighting means connected with the device according to the invention can be controlled at least partially depending on the result of the data processing algorithms.

For example, the at least one sensor connected with the device according to the invention is a signal sensor, configured to detect one or more signals and the sensor data are at least partially signal data from this sensor. For example, the signal sensor is configured to detect reflections of (for example waveform) signals emitted from the device. For example, these signals are acoustic and/or electromagnetic signals. Electromagnetic signals can by way of example be signals (e.g. radio signals) of the first and/or second wireless communication networks. For example, a signal sensor is at least partially a part of the communication means (e.g. a receiver). For example, the signal processing means are configured to control the lighting means connected with the device according to the invention at least partially depending on these signal data. For example, the signal processing means are configured to apply one or more data processing algorithms to the signal data. For example, these data processing algorithms can serve to detect objects, e.g. to detect objects at least partially reflecting (for example waveform) signals emitted by the device. For example, the lighting means connected with the device according to the invention can at least partially be controlled depending on the result of the data processing algorithms.

In exemplary embodiments of the invention the signal processing means are furthermore configured to process the sensor data at least partially, so that the sensor data are at least partially compressed, prepared and/or evaluated, wherein the fourth data at least partially comprise the processed sensor data.

For example, the signal processing means can be configured to apply one or more data compression algorithms to the sensor data. An example of a data compression algorithm is run-length encoding and/or Huffman coding. The data compression algorithm applied is by way of example dependent upon the nature of the sensor data. For example, to video data a video compression algorithm or video codec (e.g. MPEG-1, MPEG-2, MPEG-4), to audio data an audio compression algorithm or audio codec (e.g. MP3, AC-3, WMA) and to image data an image data compression algorithm (e.g. JPEG) is applied. For example, the fourth data comprise at least partially the compressed sensor data. This is for example advantageous, in order to reduce the amount of second data (sent via the at least one wireless communication network).

For example, the signal processing means can be configured to apply one or more data preparation and/or data evaluation algorithms to the sensor data. An example of a data preparation algorithm is an algorithm to improve the data quality (e.g. an algorithm for noise suppression and/or to improve the image quality). An example of a data evaluation algorithm is an algorithm for object recognition in image data and/or an algorithm for statistical evaluation of the sensor data (e.g. an algorithm to determine the mean and/or the distribution of measurement data).

For example, the fourth data comprise at least partially the prepared and/or evaluated sensor data. This is for example advantageous, in order to reduce the amount of second data (sent via the at least one wireless communication network) and/or to minimise the effort by a central control device on preparing and/or evaluating the second data.

For example, through a data evaluation algorithm a certain environmental situation (such as for example a child running onto the road and/or the current traffic volume) can be detected, and through a data evaluation algorithm regularly reoccurring environmental situations (such as for example a high traffic volume at a certain time) can be detected. For example, the signal processing means are configured to control the lighting means connected with the device according to the invention at least partially depending on these findings. This is for example advantageous, in order to allow a local intelligent control of the lighting means.

In exemplary embodiments of the invention the communication means are furthermore configured to control the transmission of the second data at least partially. For example, the communication means are configured to control the transmission of the second data at least partially so that the energy expenditure is minimised (e.g. the energy expenditure per useful bit). For example, the communication means are configured to control the transmission of the second data at least partially depending on the available bandwidth and/or the channel quality. For example, the communication means are configured to at least partially control the transmission time, the aggregation and/or the compression rate of the second data.

For example, the communication means are configured to influence and/or control the compression rate of a data compression algorithm applied to the sensor data. For example, the communication means forward corresponding data with information via a desired compression rate to the signal processing means.

For example, the second data comprise data with a low priority (e.g. control information) and data with a high priority (e.g. real time video data). For example, the communication means are configured to transmit second data with high priority immediately and/or second data with low priority at a time when little use is being made of the at least one wireless communication network (e.g. at night).

For example, the communication means are configured to aggregate or combine second data prior to transmission and for example only to transmit these once a certain amount of data has been reached.

This is by way of example advantageous to allow the most efficient possible transmission of the second data via the at least one wireless communication network.

In exemplary embodiments of the invention the communication means are furthermore configured to receive the first data via a first wireless communication network (e.g. from a central control device) and to transmit the second data via the first wireless communication network (e.g. to the central control device), wherein the communication means are furthermore configured to receive fifth data via a second wireless communication network (e.g. from at least one further device for controlling a lighting means and/or at least one external sensor) and to transmit sixth data via the second wireless communication network (e.g. to the at least one further device for controlling a lighting means and/or the at least one external sensor).

For example, a central control device is connected via the first wireless communication network with the device according to the invention or the communication means of the device according to the invention. For example, the connection via the first wireless communication network is a secure connection such as an encrypted connection and/or a Virtual Private Network (VPN) connection.

For example, one or more external sensors are connected via the second wireless communication network with the device according to the invention or the communication means of the device according to the invention. External sensors are by way of example sensors located outside of the device according to the invention. For example, mobile sensors located in a vehicle. For example, one or more further devices according to the invention are connected via the second wireless communication network with the device according to the invention or the communication means of the device according to the invention. For example, the connections via the second wireless communication network are at least partially secure connections such as encrypted connections and/or VPN connections.

For example, a plurality of devices according to the invention for controlling a lighting means can form a group. For example, the devices according to the invention of a group are connected with one another via the second wireless communication network (e.g. via the respective virtual private network connections). For example, not every device according to the invention in a group is connected with the first wireless communication network. For example, at least one of the devices according to the invention in a group is connected with the first wireless communication network and forwards the first data received via the first wireless communication network at least partially to the other devices according to the invention of the group. For example, the connections via the second wireless communication network are at least partially secure connections such as encrypted connections and/or VPN connections. For example, the system according to the invention comprises one or more groups of devices according to the invention for controlling a lighting means.

For example, the sixth data are based at least partially on the first data. For example, the first data comprise the sixth data, which are intended for one or more further devices for controlling a lighting means. For example, the communication means are configured to transmit the sixth data for the further devices for controlling a lighting means via the second wireless communication network to the further devices for controlling a lighting means.

For example, the second data are based at least partially on the fifth data. For example, the fifth data comprise at least partially data from one or more further devices for controlling a lighting means and/or sensor data from an external sensor. For example, the communication means are configured to transmit these fifth data as part of the second data via the first wireless communication network (e.g. to the central control device).

Exemplary embodiments of the invention thus provide a flexible and expandable solution for controlling lighting means, for operating sensors and for communication in particular in outdoor applications. Exemplary embodiments of the invention allow, inter alia, secure, flexible, efficient and robust communication with the device according to the invention, with the signal processing means, with at least one sensor connected with the device and with further devices for controlling a lighting means to be achieved (e.g. via the first and the second wireless communication network) and flexible and efficient data processing. The device according to the invention provides for example a gateway or a gateway functionality, which for example can be used by further devices for controlling a lighting means and/or with sensors connected with the device according to the invention. This is for example advantageous, to be able to design the communication via the first wireless communication network to be more efficient and for example to be able to communicate with a group of devices according to the invention for controlling a lighting means and/or with one or more (external) sensors via one of the devices according to the invention of the group. This is by way of example furthermore advantageous, since only a small number of participants in the first wireless communication network have to be managed. For example, a plurality of sensors connected with the device according to the invention and a group of devices according to the invention can use the same SIM network module of one of the devices according to the invention for communication via the first wireless communication network (known as SIM sharing).

It is also by way of example conceivable, for the fifth data to be at least partially received via one or more further wireless communication networks (e.g. a third-party wireless communication network) and/or the sixth data to be at least partially transmitted via one or more further wireless communication networks (e.g. a third-party wireless communication network).

In exemplary embodiments of the invention the first wireless communication network is part of a machine-to-machine network. For example, the first wireless communication network is a mobile radio network, used for data transmission in the machine-to-machine network. Machine-to-machine (M2M) means the automated exchange of information between terminal devices such as sensors, computers, automation, vehicles or containers and/or with a central control device, e.g. use of the Internet and various access networks such as mobile radio networks.

In exemplary embodiments of the invention the second wireless communication network is a wireless local network (e.g. a WLAN and/or or a Bluetooth network).

In exemplary embodiments of the invention the second data are based at least partially on the fifth data. In exemplary embodiments of the invention the sixth data are based at least partially on the first data.

In exemplary embodiments of the invention the communication means are furthermore configured to provide a local access point, in particular a Webserver, accessible via the second wireless communication network (e.g. via WLAN and/or Bluetooth or "Freifunk").

For example, mobile communications terminals such as mobile telephones (e.g. smartphones) via the second wireless communication network can access the local access point. For example, special application programs for mobile communication terminals (e.g. APPs) and/or browser programs can enable such access. For example, information (e.g. tourist information, traffic information, message information) can be provided via the local access point for downloading to mobile communication terminals via the second wireless communication network. For example, the information can be received as part of the first data via the first wireless communication network. For example, the information can only be sent and received as part of the first data via the first wireless communication network, if the utilisation of the first wireless communication network is low (e.g. at a time when traffic conditions are favourable). For example, the local access point provides an application programming interface (API), via which device driver programs from third-party providers and/or applications from third-party providers can also be integrated.

It is by way of example also conceivable for the local access point to be accessible via one or more further wireless communication networks (e.g. a third wireless communication network).

In exemplary embodiments of the invention the first wireless communication network and/or the second wireless communication network is/are an (e.g. existing) external network (e.g. a "Freifunk" network) and/or the communication means are furthermore configured to provide a local access point of an (e.g. existing) external network (e.g. a network with an Internet connection, such as for example what are known as "Freifunk" networks). An example of a network is a wireless communication network, operated by a network operator. Examples of wireless communication networks are given above. A "Freifunk" network means for example a non-commercially operated wireless communication network.

In exemplary embodiments of the invention the first data and/or the second data are at least partially encrypted. In exemplary embodiments of the invention the fifth and/or the sixth data are at least partially encrypted.

In exemplary embodiments of the invention the communication means, the signal processing means and the security means in each case comprise at least one different hardware module. A hardware module is, as described above, by way of example an electronic circuit, a processor and/or a programmable logic device.

A hardware module can be one-time programmable (unchangeable) or programmable (changeable). A one-time programmable hardware module is by way of example a one-time programmable logic device, in which through the activation of fuses and antifuses at least one logic function can be hardwired. A one-time programmable hardware module is by way of example a processor with an (internal) read-only memory, wherein in the read-only memory programming instructions for performing at least one logic function are stored. A programmable hardware module is by way of example a processor with a memory (e.g. a random access memory), wherein in the memory (e.g. the random access memory) programming instructions for performing at least one logic function are stored.

A hardware module is by way of example configured to perform one or more logic functions. The logic functions can be hardwired in a one-time programmable hardware module (unchangeable) or be fixed programmed. The logic functions can be programmed in a programmable hardware module (changeable).

As described above, the communication means, the signal processing means and the security means are responsible for performing various process steps of the method according to the invention (e.g. in or by the device according to the invention). Through the distribution of the process steps across various hardware modules of the device according to the invention it is possible to enable particularly secure, flexible, efficient and robust communication with the device according to the invention, with at least one sensor connected with the device and with further devices for controlling a lighting means (e.g. via the first and the second wireless communication network). Furthermore, this distribution allows at least partially parallel performance of the process steps and at least partially parallel data processing, so that the data processing is efficient and flexible.

In exemplary embodiments of the invention the communication means comprise a first circuit and the signal processing means a second circuit and the security means a third circuit. For example, the first circuit, the second circuit and the third circuit are in each case an electronic circuit with at least partially different electronic components.

In exemplary embodiments of the invention the first circuit, the second circuit and the third circuit in each case take the form of an integrated circuit, in particular an Application Specific Integrated Circuit.

In exemplary embodiments of the invention the communication means comprise a first processor (e.g. a general purpose processor). For example, the communication means comprise at least one first processor and at least one memory (e.g. a program memory and a main memory). For example, in the memory an operating system (e.g. an embedded operating system such as embedded Linux or Windows CE) and a communication program are stored. For example, such operating systems are supported by various manufacturers of network interfaces (e.g. network modules), so that one or more network interfaces (e.g. a network module) can be integrated via device driver programs available from the manufacturers into the operating system. For example, the communication program in the memory can be adapted and/or changed. This is for example advantageous, in order to enable high flexibility and expandability of the communication means.

For example, the first processor is an Advanced RISC Machines processor (ARM). ARM processors have low power consumption and are supported by many mobile and/or embedded operating systems.

In exemplary embodiments of the invention the signal processing means comprise a second processor (e.g. a general purpose processor) and/or a FPGA circuit. For example, the signal processing means comprise at least one second processor and at least one memory. For example, in the memory an operating system (e.g. an embedded operating system) and control and/or signal processing program are stored. This is for example advantageous, in order to enable high flexibility and expandability of the signal processing means.

For example, the second processor is an ARM processor. ARM-processors have a low power consumption and are supported by many mobile and/or embedded operating systems. For example, the second processor is an Application Specific Instruction Set Processor.

For example, the signal processing means comprise at least one FPGA circuit. For example, in the memory of the FPGA circuit a control and/or signal processing program is stored, which specifies a configuration of the FPGA circuit for a corresponding logic function. FPGA circuits allow parallel processing of data (e.g. unlike microcontrollers, which process data sequentially) and are therefore well-suited to real time applications such as digital signal processing. Logic functions can be added to, or removed from an FPGA circuit. The lifetime of FPGA-supported developments is longer. This is by way of example advantageous, to enable processing of data by the signal processing means for time-critical applications as well.

It is by way of example also conceivable for the signal processing means to comprise at least two or more processors. For example, the signal processing means comprise a FPGA circuit and a second processor such as an ARM processor. This is by way of example advantageous, to enable firstly high flexibility and expandability of the signal processing means, on the one hand, and also to enable the processing of data by the signal processing means for time-critical applications, on the other. For example, the FPGA circuit and the ARM processor can process different time-critical data in parallel.

In exemplary embodiments of the invention the security means comprise an encryption processor and/or a hardware security module. An encryption processor and/or a hardware security module is by way of example a one-time programmable hardware module. For example, the key for decrypting the third data and/or the key for encrypting the fourth data is/are hardwired in and/or fixed programmed into the encryption processor and/or the hardware security module. This is for example advantageous, to prevent manipulation of the security means.

A hardware security module is by way of example a hardware security module certified according to Series 140 of the Federal Information Processing Standards (FIPS) of the US Government standards for computer security.

In exemplary embodiments of the invention the communication means, the signal processing means and the security means in each case comprise at least one different circuit block of an integrated circuit, in particular an Application Specific Integrated Circuit. For example, the Application Specific Integrated Circuit can comprise the first processor as a circuit block of the communication means. For example, the Application Specific Integrated Circuit can comprise the second processor and/or the FPGA circuit as a circuit block of the signal processing means. For example, the Application Specific Integrated Circuit can comprise the encryption processor and/or the hardware security module as a circuit block of the security means.

Through adaptation of their architecture to a specific logic function, Application Specific Integrated Circuits can operate very efficiently and much faster than a software implementation with the same functions in a general purpose processor. Furthermore, Application Specific Integrated Circuits allow the integration of various circuit blocks in one module. In particular where there is a large number of parts, Application Specific Integrated Circuits have a cost advantage.

In exemplary embodiments of the invention the first data comprise one or more computer programs with program instructions for the communication means, the signal processing means and/or the security means.

For example, the first data comprise an update program for a communication program stored in a memory of the communication means. For example, an update program comprises program instructions causing a processor of the communication means (e.g. the first processor), when performed by the processor, to adapt a communication program stored in a memory of the communication means. This is by way of example advantageous, in order to enable a flexible adaptation and expansion of the communication program by a central control device.

For example, the first data comprise an update program for a control and signal processing program stored in a memory of the signal processing means. For example, the update program comprises program instructions, causing a processor of the signal processing means (e.g. the second processor), when performed by the processor, to adapt a control and signal processing program, stored in a memory of the signal processing means. For example, the update program can comprise a new signal processing algorithm and/or a device driver program for a sensor connected with the device according to the invention. For example, the signal processing means can thus be adapted for any sensors by downloading suitable signal processing algorithms and/or device driver programs via the at least one wireless communication network. For example, the update program can comprise suitable control parameters for a lighting means connected with the device according to the invention. This is by way of example advantageous, to enable flexible adaptation and expansion of the control and/or signal processing program by a central control device to a plurality of different lighting means. For example, the control and/or signal processing program can be adapted to the characteristic curve of a lighting means and/or the power requirement (voltage supply and/or current supply) of a lighting means, so that the device according to the invention can be connected with a number of different lighting means. For example, the signal processing means (and for example the energy supply means through the signal processing means) can thus be adapted to any lighting means, by downloading suitable control parameters (e.g. a suitable intelligence) via the at least one wireless communication network.

In exemplary embodiments of the invention the signal processing means and/or the security means are furthermore configured to reset the communication means. For example, the signal processing means and/or the security means are configured to monitor the state of the communication means and, if the communication means are in an unsecure state, to reset them. For example, the signal processing means and/or the security means are configured to cause or control a resetting of the communication means to the factory state. By way of example, an operating system and/or communication program stored in a memory of the communication means can be reset to the factory state. For example, a backup copy of the operating system and/or the communication program can be stored in the factory state in a read-only memory of the communication means.

For example, the signal processing means and/or the security means, as well as the communication means, comprise a watchdog function for monitoring the communication means. For example, the communication means are configured to regularly transmit a status message to the signal processing means and/or the security means and/or regularly forward first data to the signal processing means. For example, the security means and/or the signal processing means causes or cause a reset of the communication means, if such regular transmission and/or forwarding is absent. For example, the first data can also comprise a control instruction for the signal processing means for resetting the communication means.

This is for example advantageous, to ensure that the communication means, including after a crash, a defective update program and/or an attack by malware (automatic or remotely), can be reset to a functioning state.

In exemplary embodiments of the invention, the device according to the invention furthermore comprises one or more energy supply means, which are configured to provide the communication means and the signal processing means and the security means and the lighting means connected with the device according to the invention, with power.

For example, the energy supply means are configured, for the energy supply of the lighting means connected with the device according to the invention, to provide power in a range between at least 1 Watt and 1000 Watts, wherein the signal processing means are configured to at least partially control the energy supply of the lighting means via the energy supply means. For example, the energy supply means are configured to provide the sensors connected with the device according to the invention with power, wherein the energy supply means are furthermore configured for the energy supply to the sensors connected with the device to provide a power of between at least 1 Watt and 1,000 Watts.

For example, the energy supply means comprise a power supply unit, configured to provide the device according to the invention with energy. For example, the input voltage of the power supply unit is an alternating voltage, e.g. a two-phase alternating voltage in the low voltage range between 0V and 1,000V. For example, the input voltage is an alternating voltage with a rated voltage of 230 Volts and a frequency of 50 Hertz. For example, the output voltage of the power supply unit is a direct voltage in the extra-low voltage range between 0 and 120 Volts, preferably between 0 and 75 Volts. For example, the output voltage is a direct voltage of 65 Volts. For example, the power supply unit is a transformer power supply unit and/or a switching power supply unit.

For example, the energy supply means comprise only one power supply unit, configured to provide the device according to the invention, sensors and devices connected with the device according to the invention, and the at least one lighting means connected with the device according to the invention, with energy.

For example, the energy supply means furthermore comprise a direct voltage converter configured to reduce the output voltage of the power supply unit. For example, the input voltage of the direct voltage converter is the output voltage of the power supply unit. For example, the output voltage of the direct voltage converter is a direct voltage in the extra-low voltage range between 0 and 12 Volts. For example, the output voltage of the direct voltage converter is a direct voltage of 5 Volts. For example, the output voltage of the direct voltage converter is a voltage, suitable for operating the communication means, the signal processing means, the security means and/or sensors connected with the device. For example, the communication means, the signal processing means, the security means and/or one or more sensors connected with the device are provided with energy from the power supply unit by the direct voltage converter. For example, the direct voltage converter is furthermore configured to galvanically separate the communication means, the signal processing means, the security means and one or a plurality of sensors connected with the device from the power supply unit, a driver circuit and a lighting means connected with the device.

For example, the power supply means furthermore comprise a driver circuit, configured to provide power for operating the at least one lighting means connected with the device. For example, the input voltage of the driver circuit is the output voltage of the power supply unit. For example, the output power of the driver circuit is controllable in a range from 1 to 1000 Watts. For example, the output current of the driver circuit is controllable. For example, the driver circuit is controllable by the signal processing means. For example, the driver circuit is configured to provide a constant output current and/or a modulated output current, in particular a pulse width modulated output current for operating the at least one lighting means connected with the device. For example, the at least one lighting means connected with the device is provided with energy via the driver circuit by the power supply unit. For example, the driver circuit is what is referred to as a Buck-Boost converter. An example of a driver circuit is the LT3791 driver circuit from Linear Technology.

For example, the energy supply means comprise the power supply unit, the direct voltage converter and the driver circuit. Preferably the energy supply means, as described above, comprise only one power supply unit. This is for example advantageous, in order that just one power supply unit is needed for supplying the various means or components. For example, the power supply unit, when used in a street lamp, can be connected in the mast, so that only (non-hazardous) extra-low voltages pass through the upper areas of the street lamp. This is for example advantageous, since in such an extra-low voltage area many safety guidelines do not apply. For example, then, by way of example, persons who are not certified electricians can also connect sensors and devices with the device according to the invention.

In an alternative embodiment of the invention, an alternative device according to the invention for controlling a lighting means comprises one or more communication means, which are configured to receive first data via at least one wireless communication network and to transmit second data via the at least one wireless communication network, one or more signal processing means, which are configured to control a lighting means connected with the device according to the invention at least partially depending on first data forwarded by the communications means to the signal processing means, wherein the signal processing means are furthermore configured to forward third data to the communication means, and one or more energy supply means, which are configured to provide the communication means, and the signal processing means and the security means and the lighting means connected with the device with energy.

The difference between the alternative embodiment of the invention and the abovementioned device according to the invention is that according to the device according to the invention of the alternative embodiment of the invention, the alternative device according to the invention instead of the security means comprises the energy supply means. The security means are merely an optional feature of the alternative device according to the invention of the alternative embodiment of the invention. Irrespective of this difference, the features, definitions and exemplary embodiments described above for the device according to the invention are also understood to disclose corresponding features, definitions and exemplary embodiments of the alternative device according to the invention of the alternative embodiment of the invention. This applies in particular to the description of the communication means, the signal processing means and the energy supply means.

Further advantageous exemplary embodiments of the invention can be learned from the following detailed description of some exemplary embodiments of the invention, in particular in conjunction with the figures.

The figures accompanying the application serve merely for clarification, and not for determining the scope of protection of the invention. The attached drawings are not to scale and merely reflect the general concept of the invention by way of example. In particular, features contained in the Figures, should in no way be considered essential components of the invention.

DETAILED DESCRIPTION OF THE INVENTION

The present invention is described in the following using exemplary embodiments.

Figure 1A:
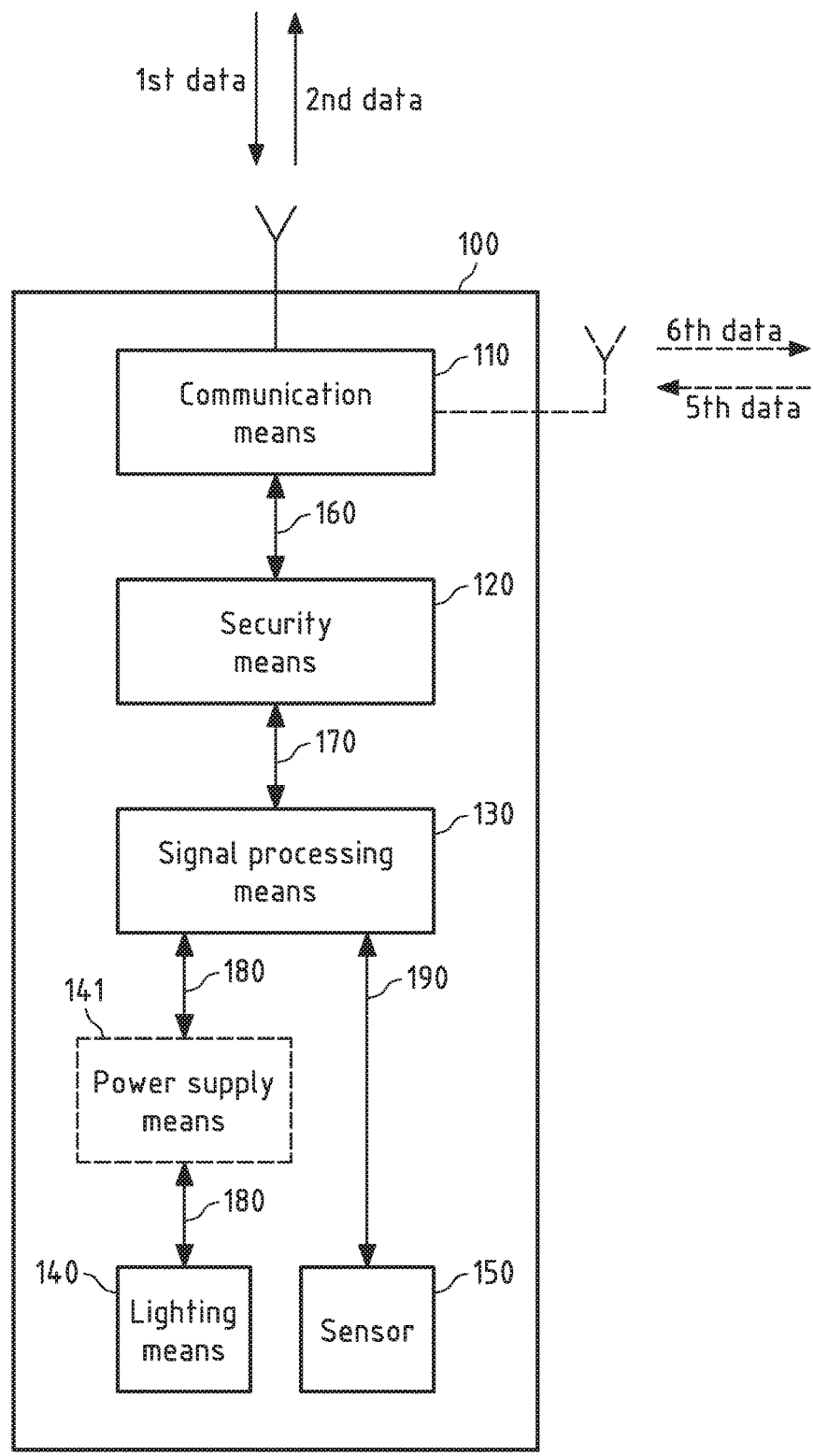
FIG. 1a shows a block diagram of an exemplary embodiment of the device according to the invention.

FIG. 1 shows a block diagram of an exemplary embodiment of the devices according to the invention for controlling a lighting means 100. The device 100 comprises one or more communication means 110, one or more security means 120 and one or more signal processing means 130. Furthermore, the device is connected with a lighting means 140 and a sensor 150. For example, the lighting means 140 and the sensor 150, as shown in FIG. 1, are disposed within the device 100. It is also conceivable, however, for the lighting means 140 and/or the sensor 150 to be disposed outside the device 100. It is furthermore conceivable for the device 100 to be connected with a plurality of lighting means 140 and/or a plurality of sensors 150.

The communication means 110 are connected via a connection 160 with the security means 120. The security means 120 are connected via a connection 170 with the signal processing means 130. A direct connection between the communication means 110 and the signal processing means 130 does not by way of example exist. The signal processing means 130 are connected via the connection 180 with the lighting means 140 and via the connection 190 with the sensor 150. For example, the connections 160, 170, 180 and 190 are wire-based connections, via which data can be transmitted. A wire-based connection is for example a lead-based or cable-based connection such as a microstrip line connection, a bond wire connection and/or a coaxial cable connection. A wire-based connection can for example allow a serial data transmission and/or a parallel data transmission.

The device 100 comprises one or more optional energy supply means 141 for the lighting means. The energy supply means 141 are disposed in the connection 180 between the signal processing means 130 and the lighting means 140, so that the signal processing means 130 are connected via the connection 180 and the energy supply means 141 with the lighting means 140.

For example, the energy supply means 141 are an operating means of a lamp which comprises the lighting means 140. Preferably, however, the energy supply means 141 are not part of a lamp.

For example, the communication means 110, the signal processing means 130 and the security means 120 in each case comprise at least one different hardware module. A hardware module is, as described above, by way of example an electronic circuit, a processor and/or a programmable logic device. A hardware module is by way of example configured to perform one or more logic functions. A hardware module can be one-time programmable or programmable (changeable). The communication means 110, the signal processing means 130 and the security means 120 are by way of example responsible for performing and/or controlling various process steps of the method according to the invention. For example, the communication means 110, the signal processing means 130 and the security means 120 in each case comprise at least one different circuit block of an integrated circuit, in particular an Application Specific Integrated Circuit.

The security means 120 comprise by way of example a hardware security module. For example, the hardware security module decrypts data received via connection 160 and forwards the decrypted data via connection 170. For example, the hardware security module encrypts data received via connection 170 and forwards the encrypted data via connection 160. Furthermore, the security means 120 can by way of example also verify the integrity of the data. This is for example advantageous, to enable secure communication with the signal processing means 130, since the data are only transmitted unencrypted via connection 170 between the security means 120 and the signal processing means 130. The security means 120 can thus be an endpoint of an end-to-end encryption.

For example, a key for decrypting the data and a key for encrypting the data can be fixed programmed into and/or hardwired in the hardware security module. For example, the encryption function and the decryption function are fixed programmed into and/or hardwired in the hardware security module. For example, the key, the encryption function and the decryption function can be hardwired in a one-time programmable logic circuit of the hardware security module by activated fuses and/or antifuses. A hardware security module is by way of example a hardware security module certified according to Series 140 of the Federal Information Processing Standards (FIPS) of the US Government standards for computer security.

For example, the security means 120 at least partially take the form of a circuit block of an Application Specific Integrated Circuit. For example, the security means 120 at least partially take the form of a circuit block of an Application Specific Integrated Circuit, which furthermore comprises a circuit block of the communication means 110 and a circuit block of the signal processing means 130. For example, the hardware security module is part of such a circuit block.

For example, the energy supply means 141 are configured to supply the lighting means 140 with energy and/or provide power for operation of the lighting means 140. For example, the energy supply means 141 comprise a controllable driver circuit and/or a controllable voltage converter (e.g. a controllable direct voltage converter). For example, the energy supply means 141 are at least partially controllable. For example, the lighting means 140 are controllable via the energy supply means 141. For example, the lighting means 140 is controllable by the signal processing means 130 via the energy supply means 141.

The lighting means 140 is by way of example an LED lighting means and/or an OLED lighting means. For example, the lighting means 140 is a direct current-based lighting means. Preferably the lighting means is a lighting means for outdoor applications. For example, the lighting means 140 is a lighting means for a street lamp.

The sensor 150 is by way of example a temperature sensor, an ambient temperature sensor, a brightness sensor, a movement sensor, an acoustic sensor, a noise sensor, an ultrasonic sensor, an optical sensor, an infrared sensor, a light sensor, an image sensor, a video sensor, a current sensor, a voltage sensor, a power sensor, an explosive material detection sensor and/or a shock sensor.

The device 100 is for example a device for controlling a lighting means in an outdoor application. The device 100 is for example a device for controlling a lighting means in a street lamp. By way of example the device 100 is used to convert or retrofit street lamps having a conventional lamp with an LED lamp. For example, the device 100 is used in street lamps.

Figure 1B:
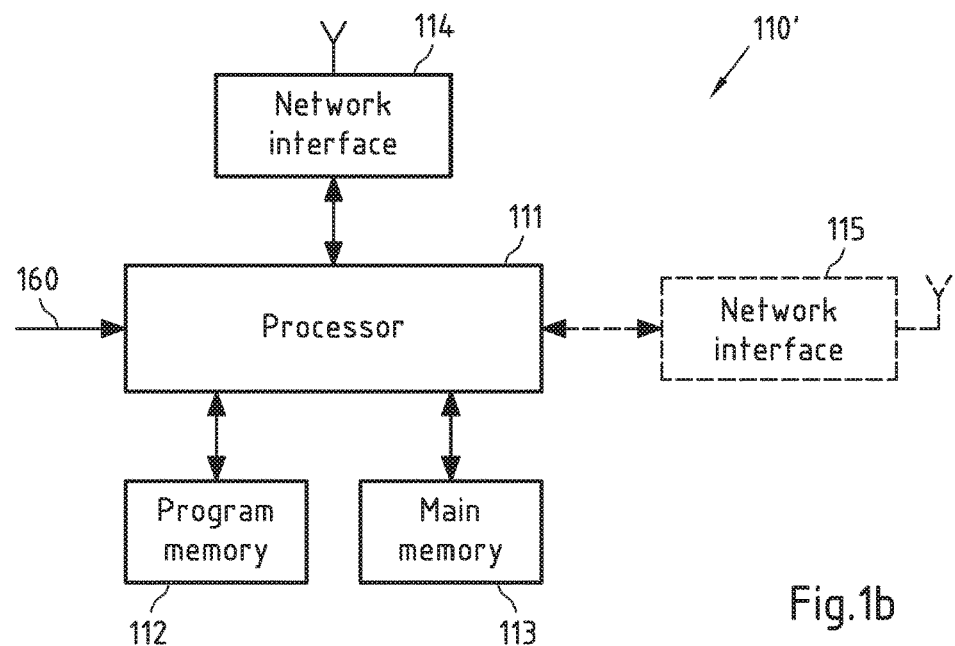
FIG. 1b shows a block diagram of an exemplary embodiment of the communication means of the device according to the invention.

FIG. 1b shows a block diagram of an exemplary embodiment of the communication means 110' of a device according to the invention. The communication means 110 of the device 100 according to the invention correspond by way of example to the communication means 110'.

The communication means 110' comprise a processor 111 with a program memory 112 and a main memory 113. Furthermore, the communication means 110' comprise a network interface 114 and an optional network interface 115.

An example of a processor is a general purpose processor, a microprocessor, a microcontroller unit such as a microcontroller, a digital signal processor (DSP), an Application Specific Integrated Circuit (ASIC), a Field Programmable Gate Array (FPGA) and an Application Specific Instruction-Set Processor (ASIP). The processor 111 is preferably an ARM processor.

A network interface comprises by way of example a network card, an antenna, a network module and/or a modem and is configured to establish a connection with a communication network (e.g. the first and/or second wireless communication network).

The program memory 112 contains by way of example an operating system and a communication program with in each case program instructions which upon start-up of the processor 111 are loaded at least partially in the main memory 113 and performed by processor 111. An example of an operating system is an embedded operating system such as embedded Linux or Windows CE. An operating system manages by way of example operating means such as the main memory 113, the program memory 112 and the network interfaces 114 and 115. For example, the communication program comprises program instructions for controlling the transmission and reception of data via the first and second wireless communication network.

For example, the processor 111 controls the network interfaces 114 and 115, wherein the control of the network interfaces 114 and 115 is by way of example enabled by a device driver program, which is part of the operating system. The network interface 114 can by way of example receive data via a first wireless communication network and forward it to the processor 111 and/or receive data from the processor 111 and transmit it via the first wireless communication network. The optional network interface 115 can by way of example receive data via a second wireless communication network and forward it to the processor 111 and/or receive data from the processor 111 and transmit it via the second wireless communication network.

For example, the communication means 110' at least partially take the form of a circuit block of an Application Specific Integrated Circuit. For example, the communication means 110' at least partially take the form of a circuit block of an Application Specific Integrated Circuit, which furthermore comprises a circuit block of the security means 120 and a circuit block of the signal processing means 130. For example, processor 111 is part of such a circuit block.

Figure 1C:
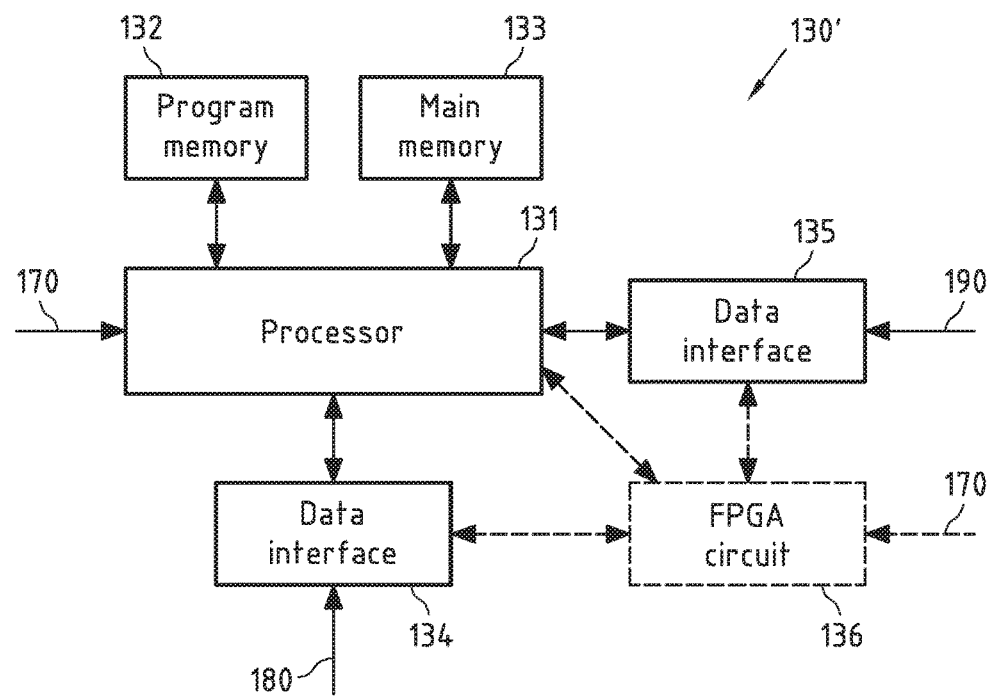
FIG. 1c shows a block diagram of an exemplary embodiment of the signal processing means of the device according to the invention.

FIG. 1c shows a block diagram of an exemplary embodiment of the signal processing means 130' of a device according to the invention. The communication means 130 of the device 100 according to the invention correspond by way of example to the signal processing means 130'.

The signal processing means 130' comprise a processor 131 with a program memory 132 and a main memory 133. Furthermore, the signal processing means 130' comprise a data interface 134 and a data interface 135.

An example of a processor is a general purpose processor, a microprocessor, a microcontroller unit such as a microcontroller, a digital signal processor (DSP), an Application Specific Integrated Circuit (ASIC), a Field Programmable Gate Array (FPGA) and an Application Specific Instruction-Set Processor (ASIP). Preferably the processor 131 is an ARM processor.

An example of a data interface is a USB interface, an IEEE 1394 interface, a CAN bus interface, a Zigbee interface, a Bluetooth interface, a serial interface such as an R232 interface and/or a parallel interface such as an IEEE 1284 interface. For example, the data interfaces 134 and 135 are wire-based data interfaces.

The program memory 132 contains by way of example an operating system and a control and signal processing program with respective program instructions, which upon start-up of the processor 131 are loaded at least partially in the main memory 133 and performed by the processor 131. An example of an operating system is an embedded operating system such as embedded Linux or Windows CE. An operating system manages by way of example operating means such as the main memory 132, the program memory 133 and the data interfaces 134 and 135. For example, the control and signal processing program comprises program instructions for controlling the lighting means 140 and/or for processing data from the sensor 150.

For example, the processor 131 controls the data interfaces 134 and 135, the lighting means 140, the energy supply means 141 and the Sensor 150, wherein the control by way of example is at least partially in each case enabled by the control and signal processing program and/or a device driver program, which is part of the operating system.

Furthermore the signal processing means 130' apart from processor 131 can comprise an optional FPGA circuit 136. This is for example advantageous if processor 131 is an ARM processor. For example, processor 131 and FPGA circuit 136 can undertake control of the data interfaces 134 and 135, the lighting means 140, the energy supply means 141 and the sensor 150 on a joint or distributed basis. For example, processor 131 can control data interface 134, the lighting means 140 and the energy supply means 141. For example, FPGA circuit can control data interface 135 and sensor 150. FPGA circuits allow parallel processing of data (e.g. unlike microcontrollers, which process data sequentially) and are therefore well-suited to real time applications such as digital signal processing. Logic functions can be added to, or removed from, an FPGA circuit. The lifetime of FPGA-supported developments is longer. This is by way of example advantageous, to enable processing of data by the signal processing means 110' for time-critical applications as well.

For example, the processor 131 and the FPGA circuit 136 are optimised for parallel data processing. This is by way of example advantageous, to enable high flexibility and expandability of the signal processing means 110', on the one hand, and processing of data by the signal processing means 110' for time-critical applications also, on the other. For example, the FPGA circuit 136 and the processor 131 can process various time-critical data in parallel. For example, the FPGA circuit 136 controls the lighting means 140 and/or the energy supply means 141 and the processor processes the sensor data from sensor 150 and sensor 280. It is by way of example also conceivable for the signal processing means 110' to comprise other or further processors.

The data interface 134 can by way of example receive data from the lighting means 140 or the energy supply means 141 and forward this to the processor 131 and/or the FPGA circuit 136 and/or receive data from the processor 131 and/or the FPGA circuit 136 and send it to the lighting means 140 or the energy supply means 141. The data interface 135 can by way of example receive data from the sensor 150 and the sensor 280 and forward it to the processor 131 and/or FPGA circuit 136 and/or receive data from the processor 131 and/or FPGA circuit 136 and forward it to the sensor 150 and the sensor 280.

For example, the signal processing means 130' at least partially take the form of a circuit block of an Application Specific Integrated Circuit. For example, the signal processing means 130' at least partially take the form of a circuit block of an Application Specific Integrated Circuit, which furthermore comprises a circuit block of the communication means 110 and a circuit block of the security means 120. For example, processor 131 and FPGA circuit 136 are part of such a circuit block.

Figure 2:
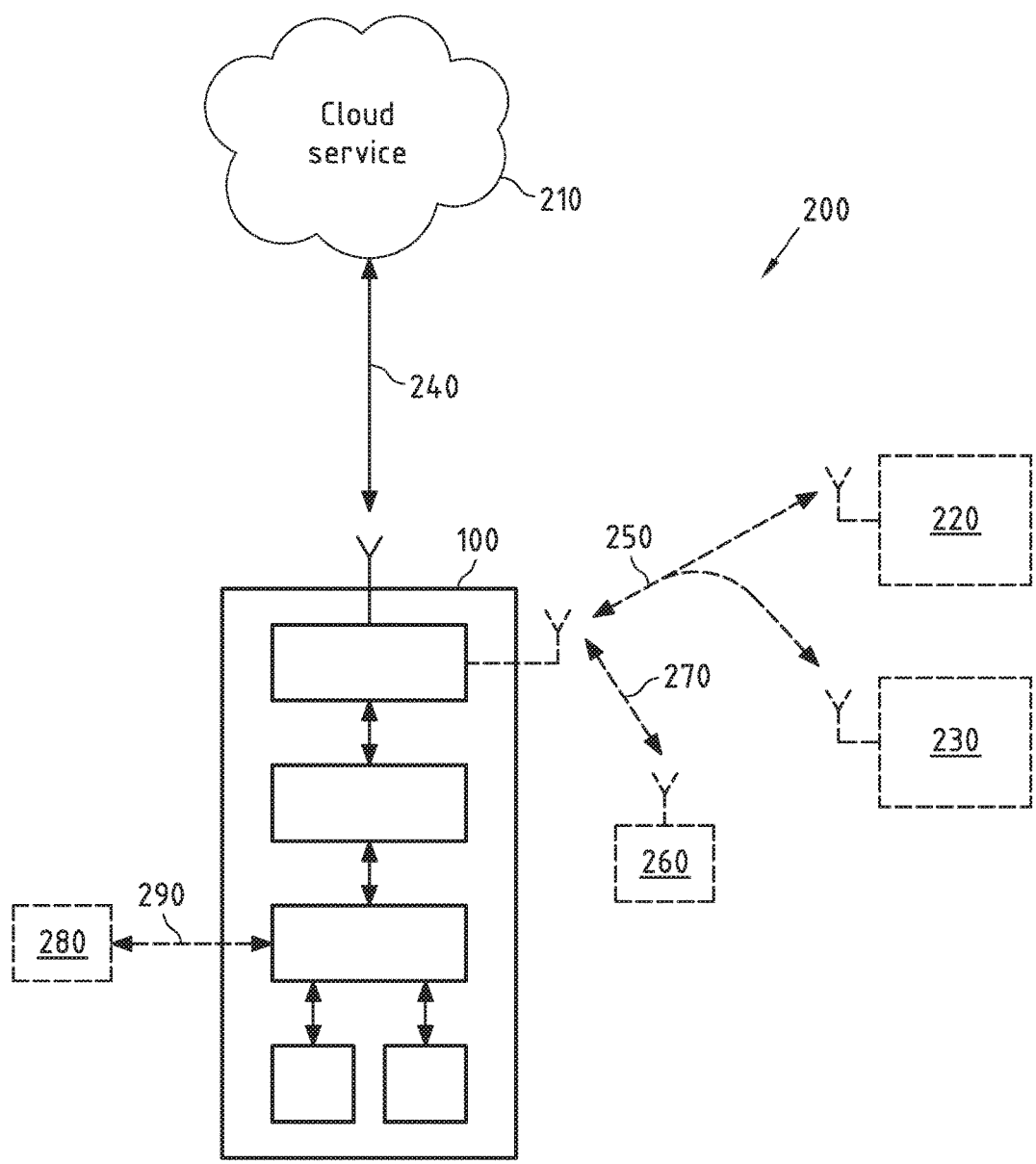
FIG. 2 shows a block diagram of an exemplary embodiment of the system according to the invention.

FIG. 2 shows a block diagram of an exemplary embodiment of the systems 200 according to the invention. The system 200 comprises at least one device 100 according to the invention and a cloud service 210.

The device 100 is connected via a connection 240 with the cloud service 210. The connection 240 is by way of example at least partially a connection via a first wireless communication network. The first wireless communication network is for example a mobile radio network. The connection 240 is for example a secure connection such as an encrypted connection and/or a VPN connection.

Cloud service 210 comprises by way of example one or more central control devices of an operator of the devices 100, 220 and 230.

For example, the system 200 optionally comprises a first device for controlling a lighting means 220 and a second device for controlling a lighting means 230.

The device 100 is connected via the connections 250 with the devices 220 and 230. The connections 250 are by way of example connections via a second wireless communication network. The second wireless communication network is for example a wireless local network. The connections 250 are for example secure connections such as encrypted connections and/or VPN connections.

Devices 220 and 230 are by way of example in each case further devices according to the invention 100. For example, device 100, device 220 and device 230 form a group of devices according to the invention.

For example, the system 200 optionally comprises a first external sensor 260.

The device 100 is connected via connection 270 with the external sensor 260. The connection 270 is by way of example a connection via the second wireless communication network. The connection 270 is by way of example a secure connection such as an encrypted connection and/or a VPN connection.

The external sensor 260 is disposed outside of the device 100. For example, the external sensor 260 is a mobile sensor, located in a vehicle, and which is only temporarily connected with the device 100. It is also conceivable for the system 200 to comprise a plurality of first external sensors 260.

For example, the system 200 optionally comprises a second external sensor 280.

The device 100 is connected via connection 290 with the external sensor 280. The connection 290 is by way of example a wire-based connection. For example, the signal processing means 130 of the device 100 comprise a corresponding wire-based data interface. The external sensor 280 is disposed outside of the device 100. For example, the external sensor 280 is a sensor which has been connected with the device 100 later on. It is also conceivable for the system 200 to comprise a plurality of second external sensors 280.

Figure 3A:
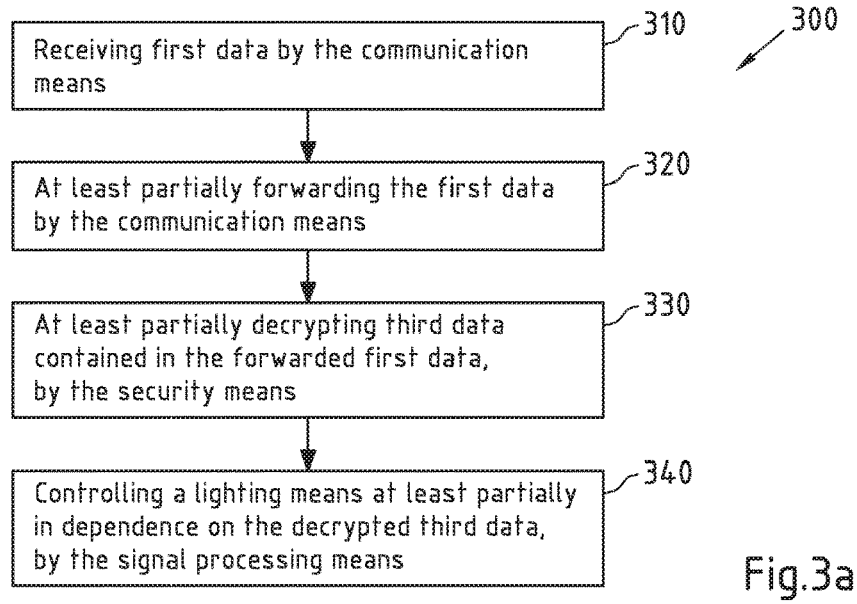
FIGS. 3a-3e show flow diagrams with the steps of exemplary embodiments of the method according to the invention.

FIG. 3a shows a flow diagram 300 with steps of an exemplary embodiment of the method according to the invention, which are performed and/or controlled by the means of the device 100 according to the invention.

In a step 310 the first data are received by the communication means 110. For example, the first data are received via connection 240 from the cloud service 210.

For example, the first data contain an update program for a communication program stored in the program memory 112 of the communication means 110'. For example, the update program comprises program instructions, which cause the processor 111, when they are performed by the processor 111, to adapt a communication program stored in the program memory 112. For example, the processor 111 automatically performs the program instructions of an update program, contained in the first data, following receipt of the first data. For example, the update program can comprise a device driver program for a sensor (e.g. sensor 260) connected with the device 100.

For example, the first data contain control instructions and/or control parameters of a central control device of the cloud services 210 for the signal processing means 130. Control instructions are for example instructions for switching on, switching off and dimming the lighting means 140. Control parameters are for example a switching on time, a switching off time, a light level threshold for switching on/switching off, a supply voltage value and a supply current value. For example, the control instructions and/or control parameters are contained in the first data in encrypted form.

For example, the first data contain an update program for a control and signal processing program stored in a program memory 132 of the signal processing means 130'. For example, the update program comprises program instructions, causing the processor 131, when they are performed by the processor 131, to adapt a control and processing program stored in the program memory 132. For example, the update program can comprise a new signal processing algorithm and/or a device driver program for a sensor connected with the device 100 (e.g. Sensor 280). For example, the update program for a control and signal processing program stored in the program memory 132 is contained in the first data in encrypted form.

In a step 320 the first data are forwarded by the communication means 110 at least partially to the signal processing means 130. For example, the communication means forward the control instructions contained in the first data, control parameters and/or an update program contained therein for a control and signal processing program contained in a memory of the signal processing means to the signal processing means 130. For example, the control instructions, control parameters and/or the update program for a control and signal processing program stored in a memory of the signal processing means are contained at the signal processing means 130 in the first data as third data. For example, the communication means 110 forward these data to the signal processing means 130, by sending these data in step 320 via the connection 160 to the security means 120.

In a step 330 third data, contained in the forwarded first data, are at least partially decrypted by the security means 120.

For example, in step 330 the security means 120 receive the third data transmitted by the communication means 110 in step 320 via the connection 160. Then the security means 120 at least partially decrypt by way of example the third data received via the connection 160. For example, the security means 120 decrypt the data received in encrypted form via the connection 160 (e.g. the control instructions and control parameters contained therein in encrypted form, and/or an update program for a control and signal processing program stored in a memory of the signal processing means, contained therein in encrypted form). For example, the security means 120 decrypt all third data received via connection 160. Then the security means 120 transmit the decrypted third data via the connection 170 to the signal processing means 130.

Furthermore, the security means 120 in step 330 can by way of example at least partially verify the integrity of the third data received via the connection 160. For example, the security means 120 only send the unencrypted third data via the connection 170 to the signal processing means 130, if the third data have integrity.

In a step 340 the lighting means 140 is at least partially controlled depending on the decrypted third data by the signal processing means 130.

For example, the signal processing means 130 receive in step 340 the decrypted third data transmitted by the security means 120 in step 330 via the connection 170. For example, the encrypted third data received in step 340 contain control instructions. For example, the signal processing means 130 control the lighting means 140 according to the control instructions contained in the third data in encrypted form. If the control instructions by way of example contain an instruction for switching off the lighting means 140, the signal processing means 130 control (or bring about the control of) the lighting means so that they are switched off (e.g. by controlling the energy supply means 141, so that they provide no further power for operating the lighting means 140).

For example, the third data received in step 340 contain control parameters. For example, the signal processing means 130 adapt the control of the lighting means 140 according to the control parameters contained in the decrypted third data. If the control parameters by way of example contain a switching off time for the lighting means 140, the signal processing means 130 control (or bring about the control of) the lighting means 140 so that they are switched off at this time (e.g. by controlling the energy supply means 141, so that from this switching off time they provide no further power for operating the lighting means 140). If the control parameters by way of example contain a specific current value for the lighting means 140, the signal processing means 130 control (or bring about the control of) the lighting means 140 so that a corresponding operating current is provided (e.g. by controlling the energy supply means 141, so that a corresponding current is provided for operating the lighting means 140).

For example, the decrypted third data received in step 340 contain an update program for a control and signal processing program stored in the program memory 132 of the signal processing means 130'. For example, processor 131 automatically performs the program instructions of an update program, which is contained in the decrypted third data received in step 340.

For example, the signal processing means 130 can control the lighting means 140 at least partially depending on sensor data from sensor 150. If the sensor 150 is an ambient temperature sensor, the signal processing means 130 can control the lighting means 140 for example so that the lighting means 140 is protected against temperatures that are harmful for the lighting means 140 (e.g. by controlling the energy supply means 141 to provide a lower current for operating the lighting means 140 at high ambient temperatures than at low ambient temperatures).

Figure 3B:
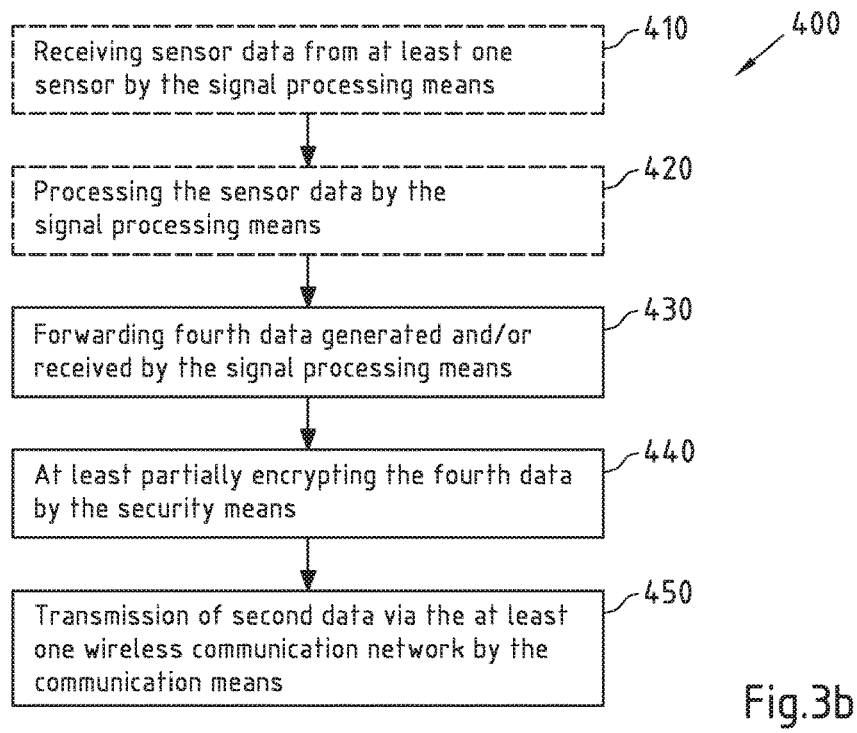

FIG. 3b shows a flow diagram 400 with steps of an exemplary embodiment of the method according to the invention, which are performed and/or controlled by the means of the device 100 according to the invention. The steps in flow diagram 400 can by way of example be carried out and/or controlled in addition to (e.g. simultaneously with) the steps in flow diagram 300 by the means of the device 100 according to the invention.

In an optional step 410 sensor data from at least one sensor are received by the signal processing means 130.

For example, the sensor data are measurement data and/or signal data from the at least one sensor. For example, the signal processing means 130 receive in step 410 sensor data from the sensor 150 via connection 190 and sensor data from the external sensor 280 via connection 290.

In an optional step 420 the sensor data are processed by the signal processing means.

For example, in step 420 the sensor data received in step 410 from sensor 150 and the external sensor 280 are processed. For example, the signal processing means 140 in the processing in step 420 apply at least one data processing algorithm such as a data compression algorithm, a data preparation algorithm and/or a data evaluation algorithm to the sensor data and/or a part of the sensor data. If the external sensor 280 is a video sensor, the signal processing means 130 apply to the real time video data received from the external sensor 280 for example a video compression algorithm or videocodec (e.g. MPEG-1, MPEG-2, MPEG-4) and/or an algorithm for object recognition in video data.

For example, the signal processing means 130 can control the lighting means 140 at least partially depending on a result of a data evaluation algorithm applied to the sensor data and/or a part of the sensor data. For example, an algorithm for object recognition in video data can detect a hazardous situation (e.g. a child running into the road). If such a hazardous situation is detected, the signal processing means 130 can by way of example control (or bring about the control of) the alternating switching on and off or the dimming up of the lighting means 140.

For example, the signal processing means 130 can control the lighting means 140 at least partially depending on the sensor data. If the sensor 150 is an ambient temperature sensor, the signal processing means 130 can control the lighting means 140 depending on the temperature data received from the sensor 150, as described above, for example so that the lighting means 140 is protected from temperatures that are damaging for the lighting means 140 (e.g. by controlling the energy supply means 141 at high ambient temperature to provide a lower current for operating the lighting means 140 than at low ambient temperatures).

In a step 430 fourth data generated and/or received by the signal processing means are forwarded by the signal processing means 130. The signal processing means 130 forward the fourth data by way of example to the communication means 110, by transmitting the fourth data in step 430 via the connection 170 to the security means 120.

For example, the third data contain control information logged by the signal processing means 130 for the cloud service 210. For example, the signal processing means log all control events (e.g. switching on, switching off, energy consumption) and/or all faults (e.g. power outage, fault in the lighting means) as control information.

For example, the fourth data are based at least partially on sensor data. By way of example the fourth data contain the sensor data received in step 410 and/or part of the sensor data received in step 410. For example, the fourth data contain the sensor data processed in step 420 or a part of the sensor data processed in step 420 or a result of the data processing in step 420.

In a step 440 the fourth data are at least partially encrypted by the security means 120.

For example, in step 440 the security means 120 receive the fourth data transmitted by the signal processing means 130 in step 430 via the connection 170. Then the security means 120 at least partially encrypt the fourth data received via the connection 170. For example, the security means 120 encrypt all fourth data received via the connection 170. Then the security means 120 transmit the encrypted fourth data by way of example via the connection 160 to the communication means 110.

In a step 450 the second data are transmitted via the at least one wireless communication network by the communication means 110. For example, the second data are transmitted via connection 240 to the cloud service 210.

For example, in step 450 the communication means 110 receive the encrypted fourth data transmitted by the security means 120 via the connection 160 in step 440. For example, the second data contain the encrypted fourth data or a part of the encrypted fourth data.

For example, the communication means 110 at least partially control the transmission of the second data in step 450. For example, the communication means at least partially control the transmission of the second data so that the energy expenditure during transmission is minimised (e.g. the energy expenditure per useful bit). For example, the communication means 110 control the transmission of the second data at least partially depending on the available bandwidth and/or the channel quality in the first wireless communication network.

For example, the communication means 110 at least partially control the transmission time, the aggregation and/or the compression rate of the second data. For example, the second data contain data with low priority (e.g. control information) and data with high priority (e.g. real time video data). For example, the communication means 110 control the transmission of second data so that second data with high priority are sent immediately and/or second data with low priority are transmitted at a time when little use is being made of the first wireless communication network (e.g. at night). For example, the communication means 110 control the compression rate of a data compression algorithm applied by the signal processing means 130 in step 420 to the sensor data. For example, communication means 110 aggregate the second data (e.g. second data with low priority) before transmission.

Figure 3C:
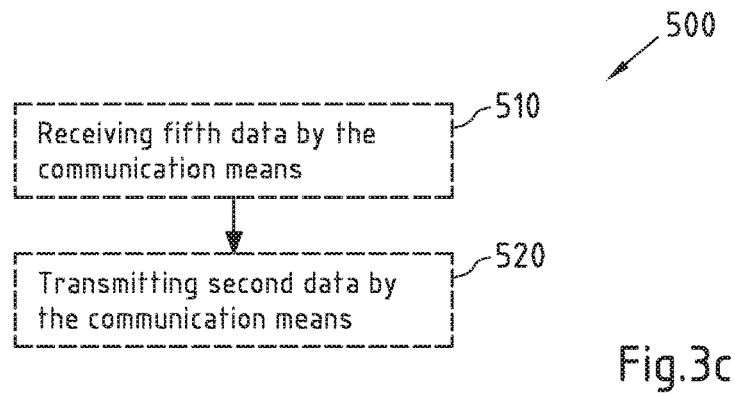

FIG. 3c shows a flow diagram 500 with optional steps of an exemplary embodiment of the method according to the invention, which can be performed and/or controlled by the means of the device 100 according to the invention. The steps in flow diagram 500 can by way of example be carried out and/or controlled in addition to (e.g. simultaneously with) the steps in flow diagrams 300 and 400 by the means of the device 100 according to the invention.

In an optional step 510 fifth data are received by the communication means 110. For example, the fifth data are received at least partially via the connections 250 from the device 220 and/or the device 230. For example, the fifth data contain data from the device 220 and/or the device 230 for the cloud service 210.

For example, the fifth data are at least partially received via the connection 270 from the external sensor 260. For example, the fifth data contain signal and/or measurement data of the external sensors 260 for the cloud service 210.

In an optional step 520 second data are transmitted by the communication means 110. Step 520 is an extension by way of example of step 450 or is an optional part of step 450. For example, the second data are transmitted via connection 240 to the cloud service 210. For example, the second data contain the fifth data or part of the fifth data.

As described above for step 450, the communication means 110 can at least partially control the transmission of the second data in step 510 also.

Figure 3D:
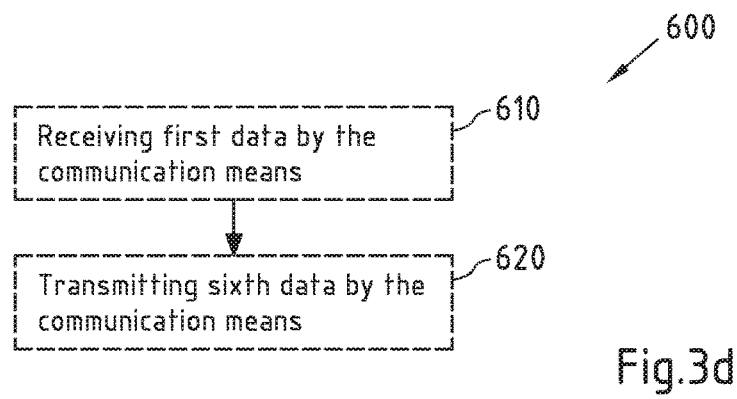

FIG. 3d shows a flow diagram 600 with optional steps of an exemplary embodiment of the method according to the invention, which can be performed and/or controlled by the means of the device 100 according to the invention. The steps in flow diagram 600 can by way of example be carried out and/or controlled in addition to (e.g. simultaneously with) the steps in flow diagrams 300, 400 and 500 by the means of the device 100 according to the invention.

In an optional step 610 first data are received by the communication means 110. Step 610 is an extension by way of example of step 310 or is an optional part of step 310. For example, the first data are received via connection 240 from cloud service 210. For example, the first data contain data intended for the device 220 and/or the device 230 (e.g. an update program, control parameters and/or control instructions).

In an optional step 620 sixth data are transmitted by the communication means 110. For example, the sixth data are transmitted via the connections 250 to the device 220 and/or 230. For example, the sixth data contain the data intended for the device 220 and/or the device 230 of the first data received in step 610.

Figure 3E:
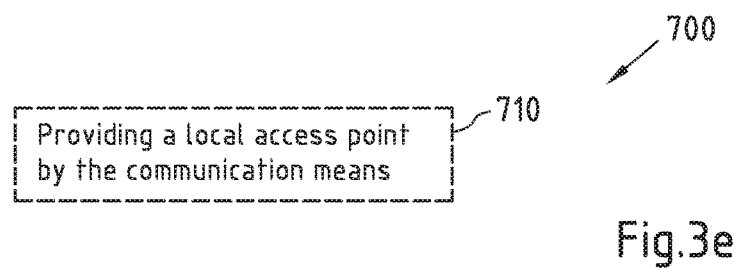

FIG. 3e shows a flow diagram 700 with optional steps of an exemplary embodiment of the method according to the invention, which can be performed and/or controlled by the means of the device 100 according to the invention. The steps in flow diagram 700 can by way of example be carried out and/or controlled in addition to (e.g. simultaneously with) the steps in flow diagrams 300, 400, 500 and 600 by the means of the device 100 according to the invention.

In an optional step 710 a local access point, in particular a webserver, is provided by the communication means 110. For example, the communication means provide the local access point via the second wireless communication network.

For example, mobile communication terminals (e.g. mobile telephones and/or smartphones) can access the local access point via the second wireless communication network. For example, special application programs for mobile communication terminals (e.g. APPs) and/or a browser program can enable such access. For example, information (e.g. tourist information, traffic information, message information) can be provided via the local access point for downloading to mobile communication terminals via the second wireless communication network. For example, the information can be received as part of the first data via the first wireless communication network. For example, the information can only be sent and received as part of the first data via the first wireless communication network, if the utilisation of the first wireless communication network is low (e.g. at a time when traffic conditions are favourable). For example, the local access point provides an application programming interface (API), via which device driver programs from third-party providers and/or applications from third-party providers can also be integrated.

By the device according to the invention by way of example a control element or a gateway for the management of direct current-based LED lighting means, mobile communication terminals (e.g. smartphones) or APPs and sensors (e.g. video sensors such as cameras and noise sensors) can be provided, enabling an integrated solution for lighting, logistics, security, traffic management, marketing and other areas. The device according to the invention can be linked as master controller or master gateway for mobile radio (e.g. via the first wireless communication network) to a central cloud solution (e.g. the cloud service 210) and can reach other slave controllers (e.g. devices 220 and 230) by way of example via WLAN (e.g. via the second wireless communication network). The mobile radio connection uses by way of example machine-to-machine networks in order to bundle a number of mobile radio connections to the respective master controllers or master gateways. A plurality of slave controllers are connected in each case via the master controllers or a master gateway with the cloud, by establishing a WLAN-based VPN connection. For example, the wireless communication network comprises a small group of at least one master (connected with a central server directly via VPN or first by a radio connection with telco networks, such as for example M2M networks, and then by a VPN carrier line to the server) and 0-N slaves (connected by a cordless VPN connection with a slave and from there to the server). The individual master controllers or master gateways can moreover provide a webserver and an access point for mobile communication terminals and/or external APPs. In addition they offer by way of example WLAN and USB interfaces for external sensors and devices. In this way a robust and energy-efficient communication and data processing between LEDs, sensors and devices is provided via four intelligence levels.

1) Cloud Server—Master Controller
2) Master Controller—Slave Controller
3) Controller—External Sensors and Devices
4) Master Controller—Master Controller The device according to the invention thus enables inter alia a secure (hardware and software encryption), robust and energy-efficient handling of data from a variety of data captures (e.g. sensors 150, 260, 280).

The device according to the invention contains by way of example the full electronics and intelligence for control of direct current-operated components of from 1 W to 1,000 W and more. Thus, by way of example digital devices and LED components can be connected. Data types (e.g. low and high data rates, continuous or sporadic data communication, bidirectional or unidirectional data traffic) can be detected and processed.

The device according to the invention can for example be adapted to any component of third-party providers, as a suitable intelligence (e.g. a corresponding device driver program) can be downloaded from the network (e.g. from the cloud service 210 via the connection 240). The logic functions of the device according to the invention (e.g. the communication means and/or the signal processing means) can by way of example be updated at any time.

The device according to the invention enables for example the bidirectional transmission of the data from individual sensors connected with the device according to the invention (e.g. external sensor 260 or external sensor 280) or other devices. The device according to the invention enables by way of example a secure transmission (e.g. through end-to-end encryption) and can forward the data of the sensors connected with the device according to the invention for example to a cloud (e.g. the cloud service 210) and via the cloud make them available to third party providers. The device according to the invention can by way of example provide a library of signal processing algorithms, in order to process the data from the sensors connected with the device according to the invention (e.g. sensor 150 and external sensor 280) following detection at the place of occurrence. By using a plurality of processors (e.g. processor 111 and 131) and FPGA circuits (e.g. FPGA circuit 136) or Application Specific Instruction Set Processors or Application Specific Integrated Circuits in the device according to the invention for example parallel data processing is enabled, so that control of a lighting means connected with the device according to the invention (e.g. lighting means 140) can take place simultaneously with the processing of data from sensors connected with the device according to the invention (e.g. sensor 150 and external sensor 280).

The device according to the invention provides by way of example a controller for a number of LED lighting means. This means, for example, that the electronics (e.g. the energy supply means 141) must be capable of responding to differing voltage and current requirements. In addition, there are many different dimming methods, such as adapting the current, pulse width modulation and bit angle modulation. LED lighting means also have differing circuitry. This results in differing requirements in operation but also in massive differences when starting up the LED lighting means. This can result in massive tensile loads, which can damage the electronics and, moreover, can lead to flickering of the LED lighting means. By linking the processors on the one hand with the energy supply means and on the other with the cloud (e.g. the cloud service 210), by way of example the appropriate logic (e.g. suitable control parameters) for various LED lighting means can be downloaded. This is for example advantageous, to enable optimal use of the LED, OLED and other direct current-based lighting means, as they are used without electronics with DC input. An extension to all alternating current-based lighting means is possible by additional components such as by way of example DALI.

The device according to the invention for example provides an intelligence for the control, communication, processing and temporary storage of data in real time. Through the combination of hardware and software-based algorithms, this allows signal processing and general processes to be performed in real time. A large amount of memory (e.g. in program memory 112 and/or in program memory 132) allows for example the temporary storage of data. The device according to the invention can for example be shipped from the factory with just an inventory number. For example, the entire logic for the respective site and for the connected components is loaded and started only at a later point in time, by way of example following installation. The logic for the individual components can be updated at any time.

The device according to the invention can by way of example have a middleware platform. External manufacturers can for example develop their own application for the public API of this middleware platform.

The device according to the invention can for example log changes of state as required and has full functionality as a stand-alone device. In addition it also has by way of example an internal table (e.g. a control table) for all planned dimming times of the LED components.

The device according to the invention provides by way of example a webserver for external APPs for smartphones, able to communicate with corresponding applications on the webserver. Furthermore, the device according to the invention can by way of example comprise interfaces (e.g. USB, bus systems and/or WiFi), in order to be able to communicate with external stationary and mobile sensors and devices.

The sequence of individual process steps in the individual flow diagrams is not imperative, unless otherwise stated alternative sequences of the process steps are conceivable. The process steps can be implemented in various ways, thus implementation by software (by program instructions), hardware, or a combination of both, is conceivable for implementation of the process steps.

The exemplary embodiments described in this specification are also to be disclosed in all combinations with each other. In particular, the description of a feature that an embodiment comprises—unless expressly stated to the contrary—is not to be understood here to mean that the feature is indispensable or essential for the functioning of the embodiment. The sequence of the process steps set out in this specification in the individual flow diagrams is not imperative, alternative sequences of the process steps are conceivable. The process steps can be implemented in various ways, thus implementation by software (by program instructions), hardware, or a combination of both is conceivable for implementation of the process steps. Terms used in the claims such as "comprising", "having", "including", "containing" and similar do not exclude further elements or steps. The wording "at least partially" includes both the case of "partially" and of "completely". The wording "and/or" includes both the case of "and" and of "or". A plurality of units, persons, or similar, means in connection with this specification a number of units, persons or similar. Use of the indefinite article does not exclude a plurality. A single device can perform the functions of several units or devices mentioned in the claims. Reference numbers given in the claims are not to be considered restrictions to the means and steps used.

The invention claimed is:

1. Device for controlling a lighting means, the device comprising:
   a communications circuit comprising a first processor, wherein the communication circuit is configured to receive first data via at least one wireless communication network and to transmit second data via the at least one wireless communication network, wherein the communication circuit is furthermore configured to forward the first data via a connection between the communication circuit and a signal processing circuit, wherein the forwarded first data comprise encrypted third data, wherein the second data are based on encrypted fourth data,
   a hardware security module, which is configured to decrypt the encrypted third data and to encrypt the fourth data, and
   a signal processing circuit comprising at least one of a second processor and a FPGA circuit, wherein the signal processing circuit is configured to control a lighting means connected with the device depending on the decrypted third data, wherein the signal processing circuit is furthermore configured to at least one of generate and receive the fourth data and to forward the fourth data via the connection between the communication circuit and the signal processing circuit, and
   wherein each of the communication circuit, the hardware security module and the signal processing circuit comprises a different hardware module.

2. Device according to claim 1, wherein at least one of the signal processing circuit and the hardware security module is furthermore configured to reset the communication circuit.

3. Device according to claim 2, wherein the communication circuit is configured to at least one of regularly transmit a status message to at least one of the signal processing circuit and the hardware security module and regularly forward first data to the signal processing circuit, and wherein at least one of the signal processing circuit and the hardware security module causes or cause a reset of the communications circuit, if such regular transmission and/or forwarding is absent.

4. Device according to claim 1, wherein the hardware security module is furthermore configured to at least partially verify the integrity of the third data.

5. Device according to claim 1, wherein the signal processing circuit is configured to receive sensor data from at least one sensor connected with the device.

6. Device according to claim 5, wherein the signal processing circuit is furthermore configured to control the lighting means connected with the device at least partially depending on the sensor data.

7. Device according to claim 4, wherein the signal processing circuit is furthermore configured to at least partially process the sensor data so that the sensor data are at least partially at least one of compressed, prepared, and evaluated, and wherein the fourth data at least partially comprise the processed sensor data.

8. Device according to claim 1, wherein the communication circuit is furthermore configured to at least partially control the transmission of the second data.

9. Device according to claim 1, wherein the communication circuit is furthermore configured to receive the first data via a first wireless communication network and to transmit the second data via the first wireless communication network, and wherein the communication means are furthermore configured to receive fifth data via a second wireless communication network and to transmit sixth data via the second wireless communication network.

10. Device according to claim 9, wherein the first wireless communication network is part of a machine-to-machine network, and wherein the second wireless communication network is a wireless local network.

11. Device according to claim 9, wherein the second data are at least partially based on the fifth data, and wherein the sixth data are at least partially based on the first data.

12. Device according to claim 9, wherein the communication circuit is furthermore configured to provide a local access point, in particular a webserver, which can be accessed via the second wireless communication network.

13. Device according to claim 1, wherein the first data and the second data are at least partially encrypted.

14. Device according to claim 1, wherein the hardware security module is disposed in the connection between the communication circuit and the signal processing circuit, so that the first data forwarded by the communication circuit and the fourth data forwarded by the signal processing circuit are transmitted via the hardware security module.

15. Device according to claim 14, wherein the communication circuit, the signal processing circuit and the hardware security module in each case comprise at least one different circuit block of an integrated circuit, in particular an Application Specific Integrated Circuit.

16. Device according to claim 1, wherein the first data comprise one or more computer programs with program instructions for at least one of the communication circuit, the signal processing circuit and the hardware security module.

17. Device according to claim 1, wherein the device furthermore comprises:
one or more energy supply means, which are configured to supply the communication circuit, the signal processing circuit and the hardware security module and the lighting means connected with the device with energy, wherein the signal processing circuit is configured to at least partially control the energy supply of lighting means by the energy supply means.

18. Device according to claim 17, wherein the energy supply means comprise:
a power supply unit configured to supply the device with energy, wherein the output voltage of the power supply unit is a direct voltage in the extra-low voltage range between 0 and 120 Volts, and
a driver circuit configured to provide power for operating the at least one lighting means connected with the device, wherein the input voltage of the driver circuit is the output voltage of the power supply unit, and wherein the driver circuit is controllable by the signal processing circuit.

19. Method for controlling a lighting means, comprising:
receiving first data via at least one wireless communication network by a communication circuit,
forwarding the first data via a connection between the communication circuit and a signal processing circuit, wherein the forwarded first data comprise encrypted third data,
decrypting the encrypted third data by a hardware security module,
controlling a lighting means depending on the decrypted third data by the signal processing circuit,
at least one of generating and receiving fourth data by the signal processing circuit,
forwarding the fourth data via the connection between the communication circuit and the signal processing circuit by the signal processing circuit, and
encrypting the fourth data by the hardware security module,
transmitting second data via the at least on wireless communication network by the communication circuit, wherein the second data are based on the encrypted fourth data, and
wherein each of the communication circuit, the signal processing circuit and the hardware security module comprises a different hardware module.

20. A machine-readable storage medium on which a computer program is stored, the computer program comprising:
program instructions, causing a device to perform the steps of the method according to claim 19, if the computer program is run by one or more processors of the device.

21. System, comprising:
at least one central control device; and
at least one device according to claim 1, wherein the at least one central control device is configured to control the at least one device.

* * * * *